April 14, 1959     C. G. R. JOHNSON ET AL     2,881,674
PAPERMAKING MACHINE
Filed March 7, 1955                                            9 Sheets-Sheet 1
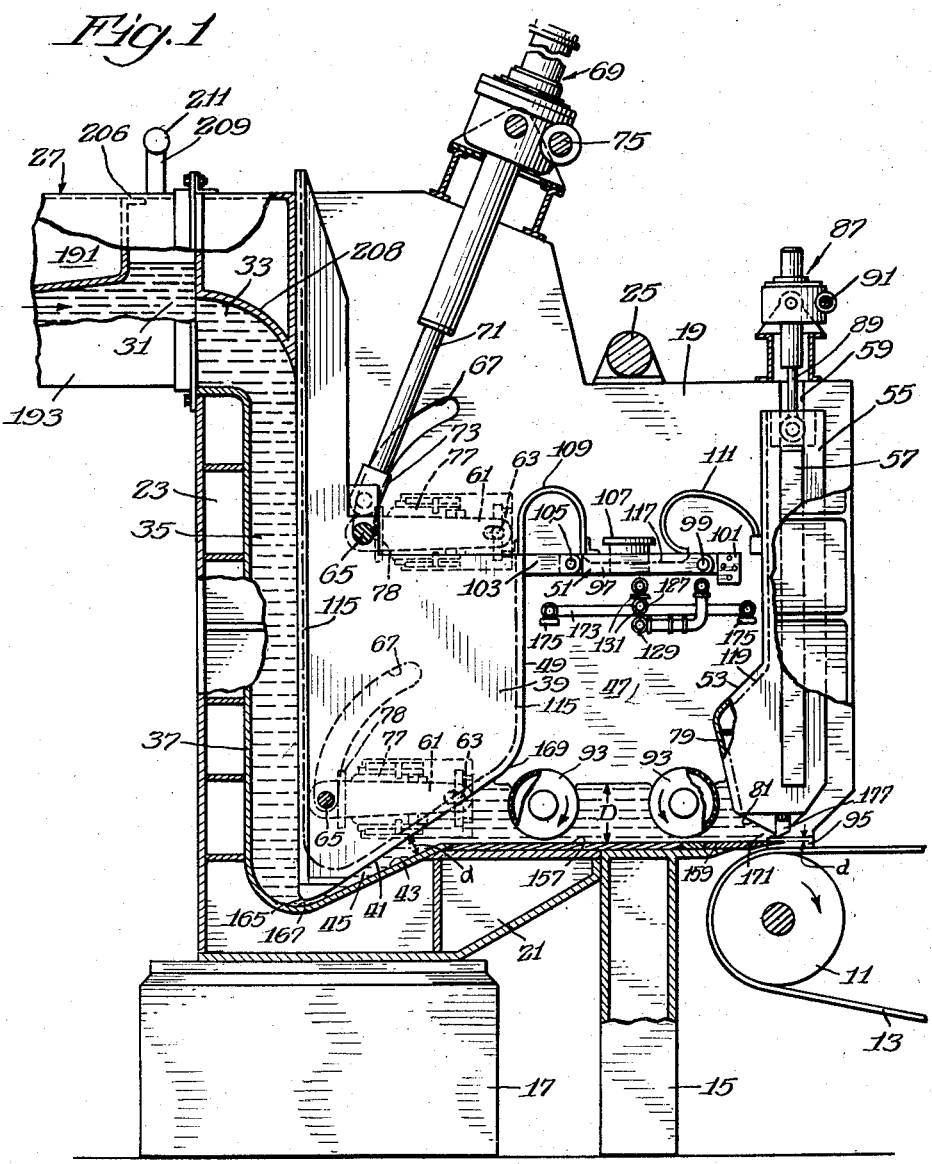
Inventors:
Charles G. Russell Johnson
Charles A. Lee
By Soans Glaister & Anderson attys.

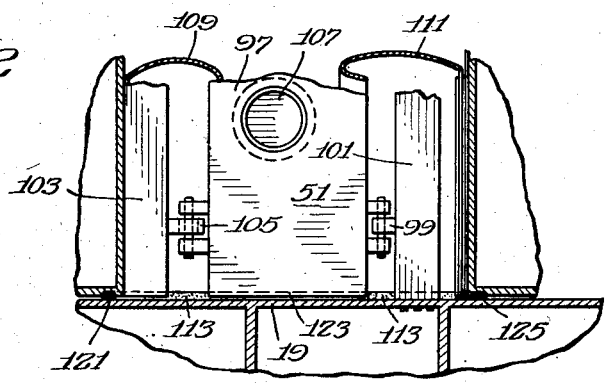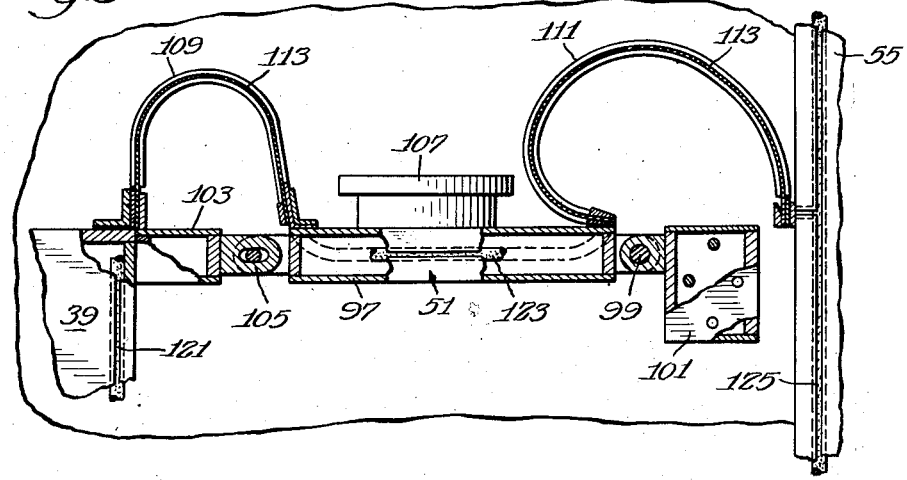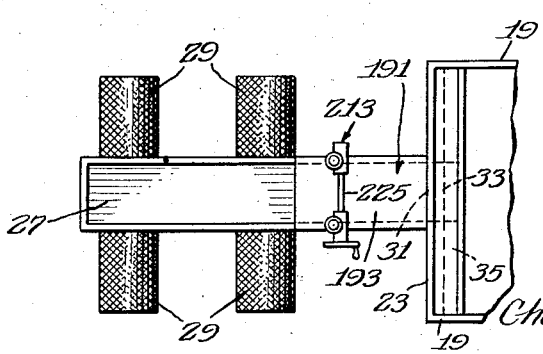

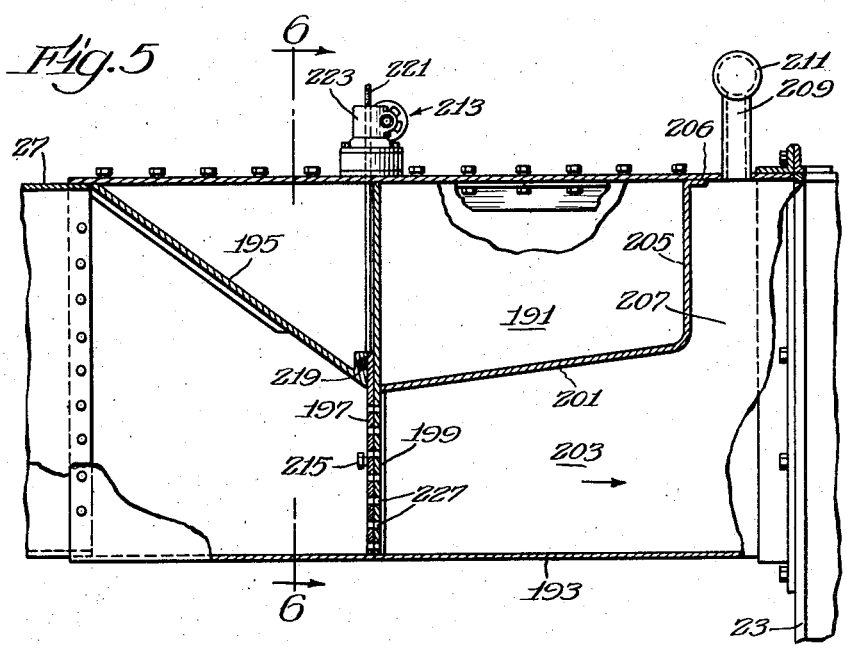
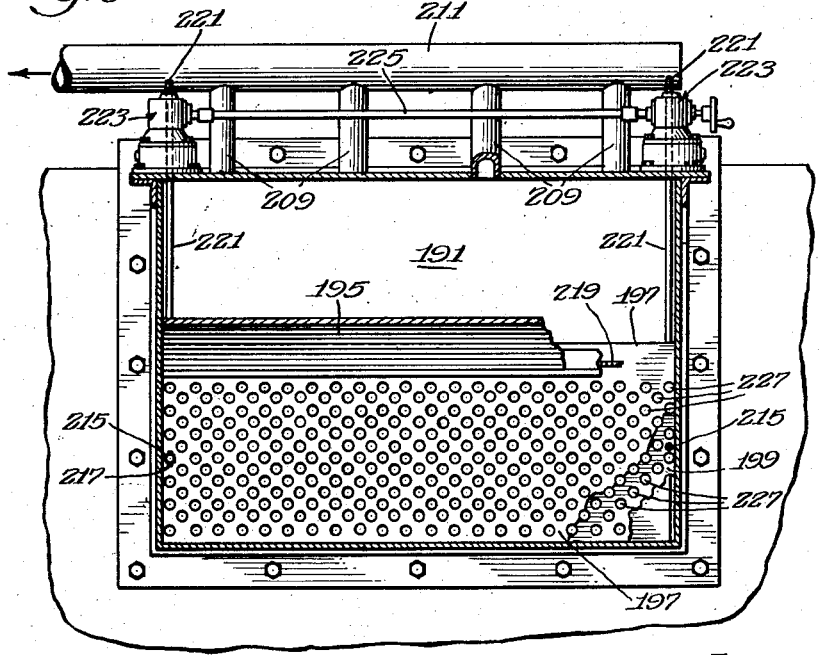

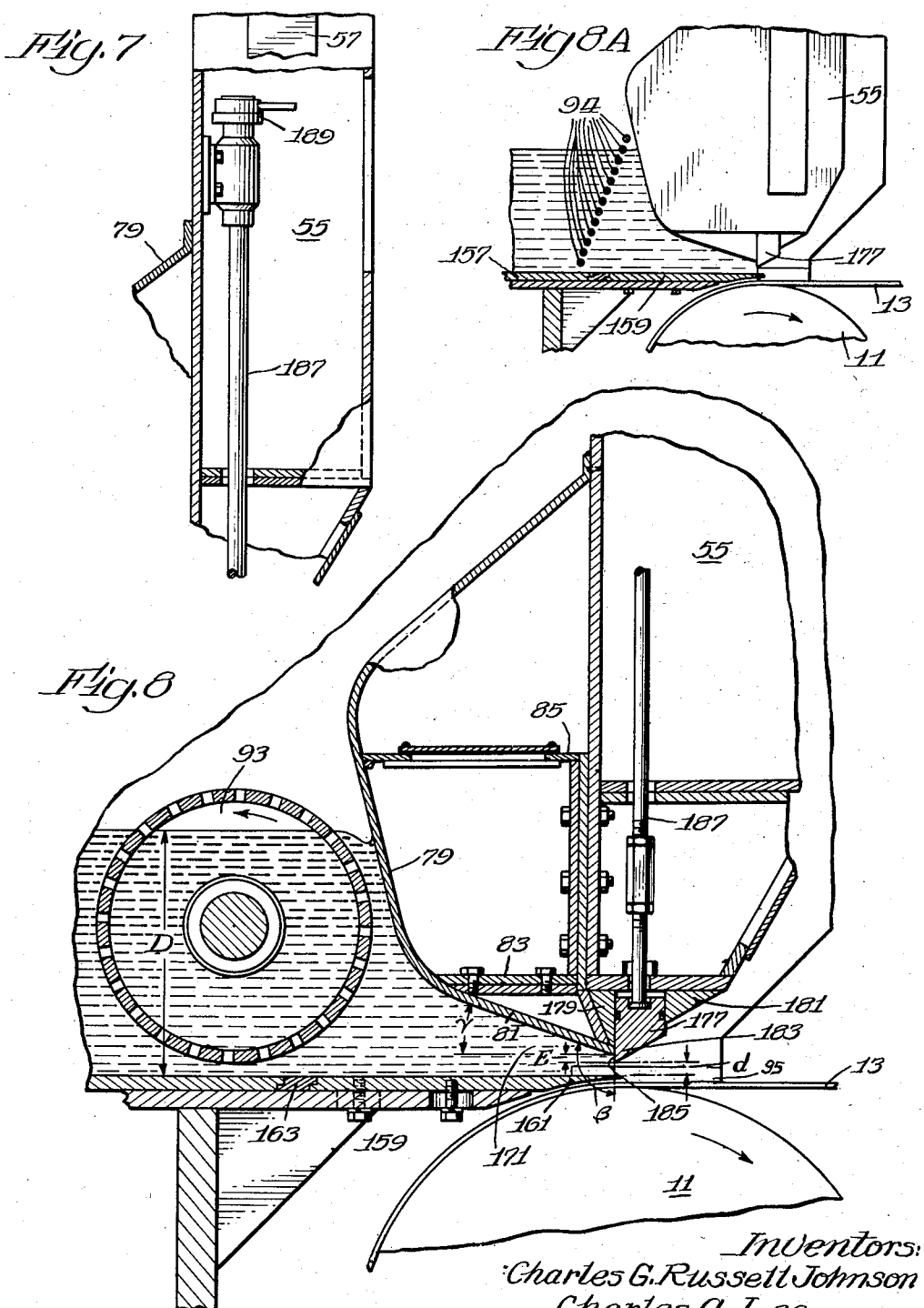

April 14, 1959  C. G. R. JOHNSON ET AL  2,881,674
PAPERMAKING MACHINE
Filed March 7, 1955  9 Sheets-Sheet 5
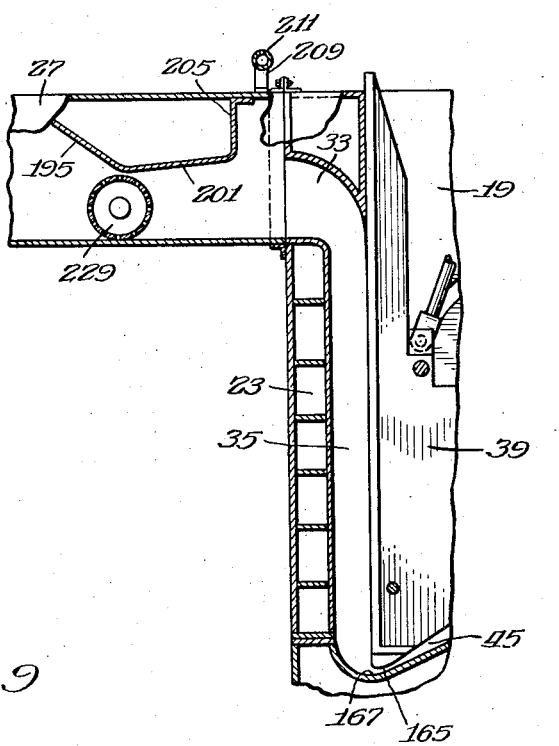
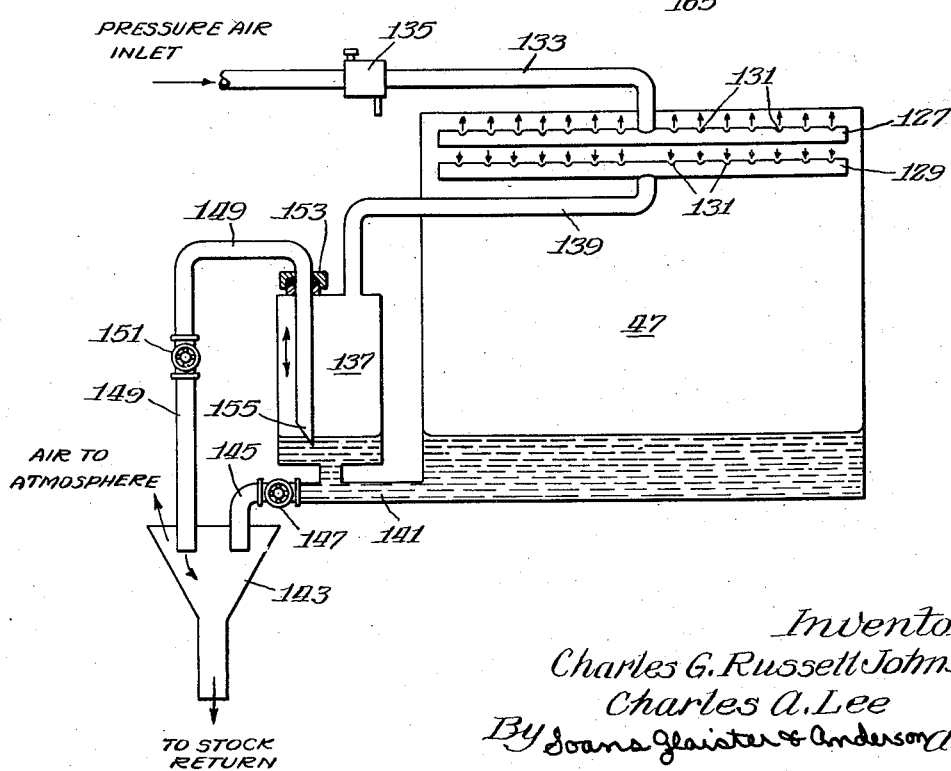
Inventors:
Charles G. Russell Johnson
Charles A. Lee
By Soans Glaister & Anderson Attys.

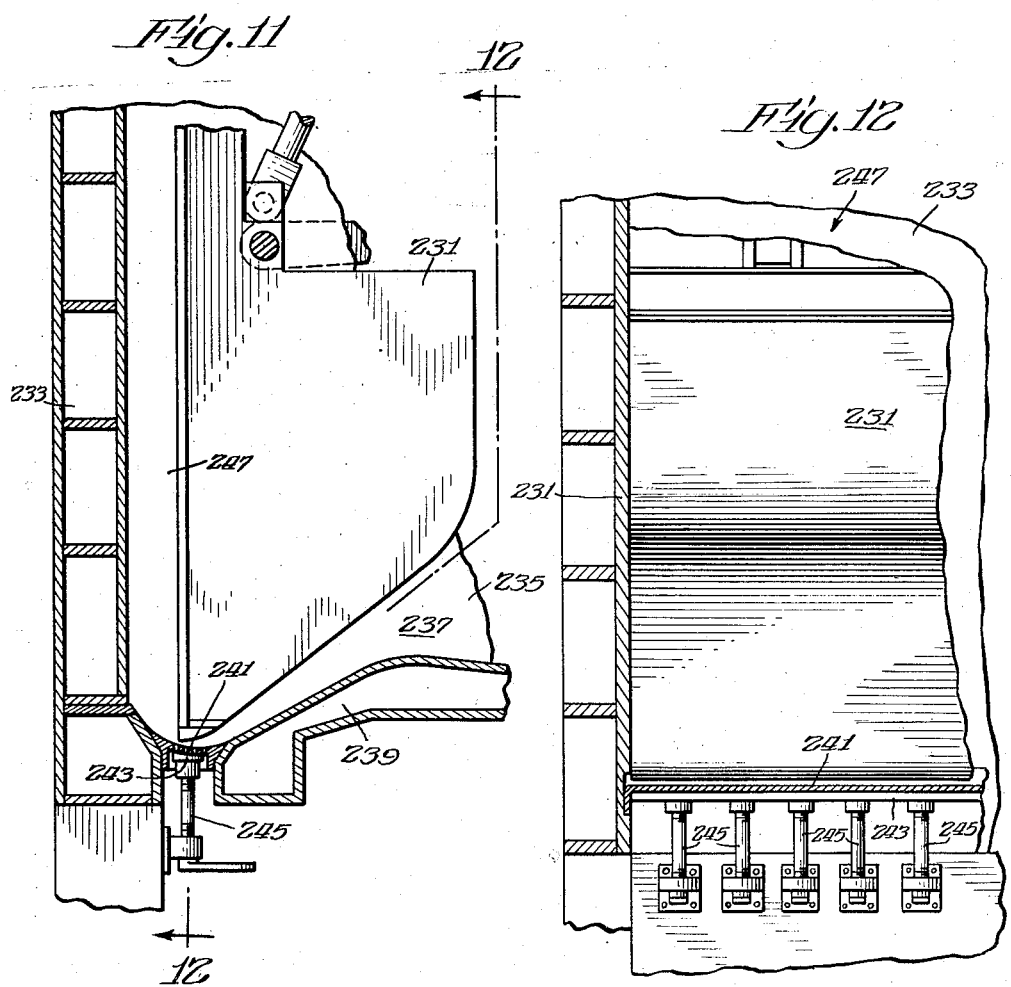

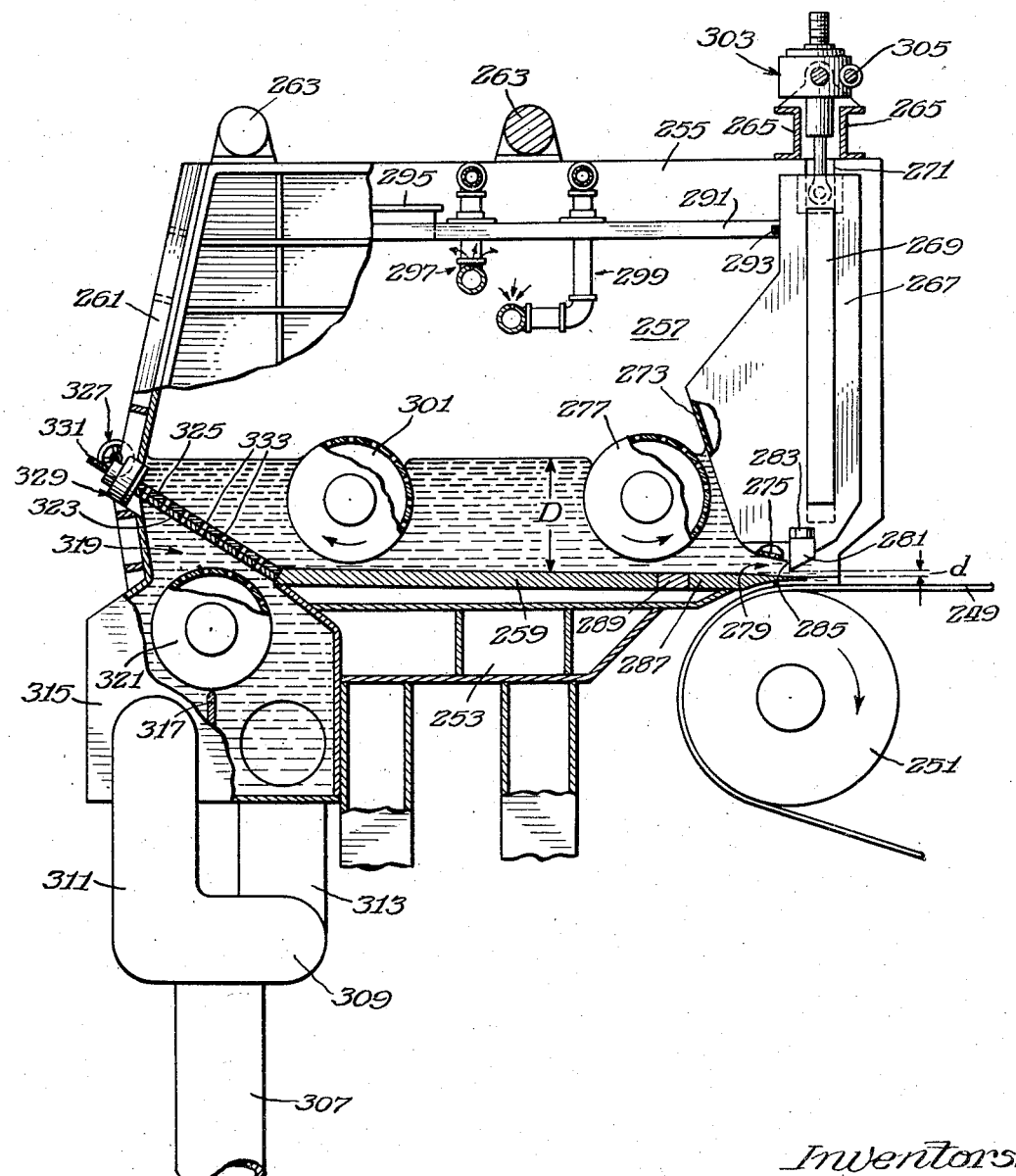

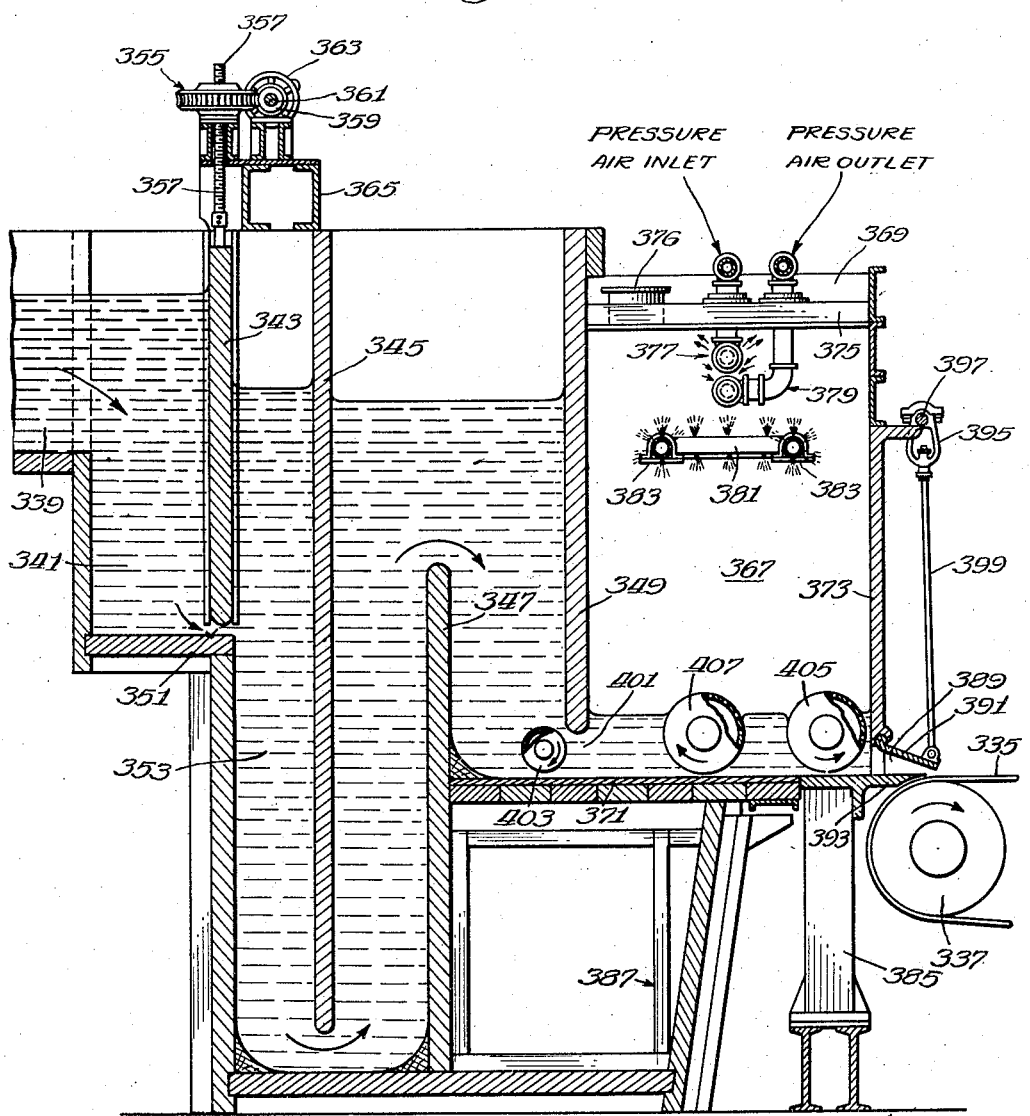

April 14, 1959    C. G. R. JOHNSON ET AL    2,881,674
PAPERMAKING MACHINE
Filed March 7, 1955     9 Sheets-Sheet 9
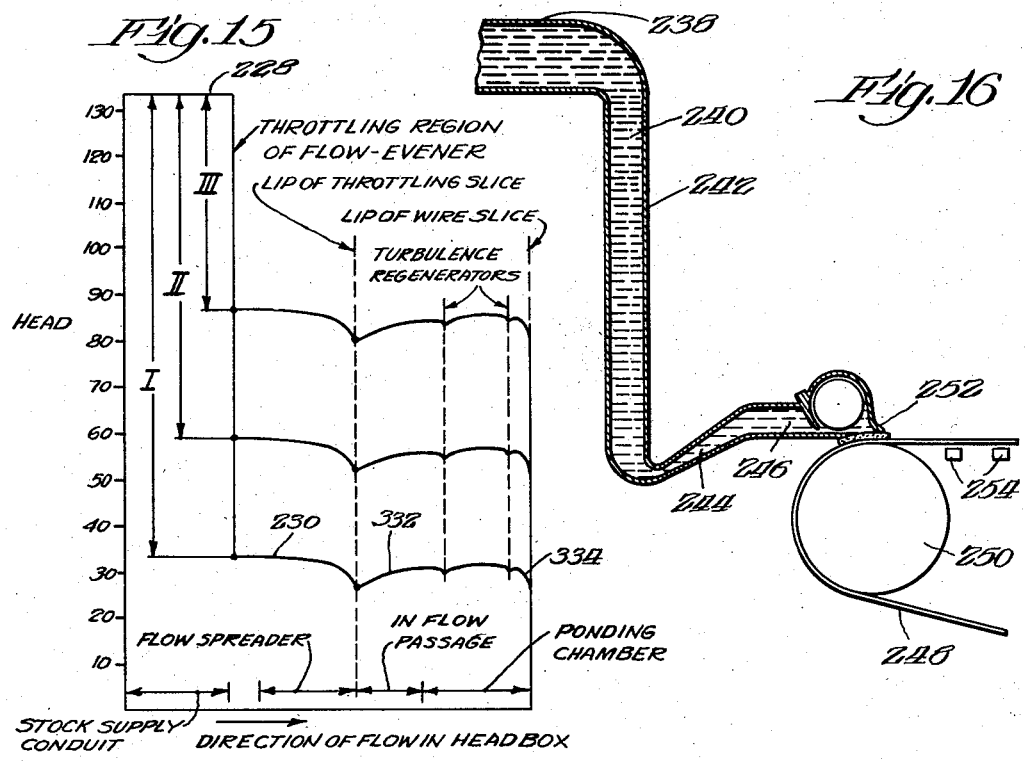
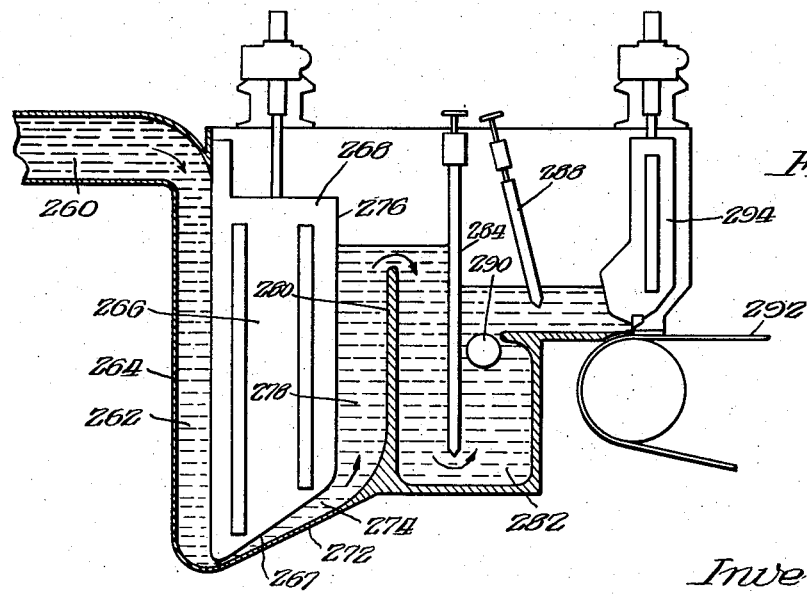
Inventors:
Charles G. Russell Johnson
Charles A. Lee
By Soans Glaister & Anderson Attys.

United States Patent Office 2,881,674
Patented Apr. 14, 1959

2,881,674

PAPERMAKING MACHINE

Charles G. Russell Johnson and Charles A. Lee, Neenah, Wis., assignors, by mesne assignments, to Kimberly-Clark Corporation, a corporation of Delaware Application March 7, 1955, Serial No. 492,396

20 Claims. (Cl. 92—44)

The present invention relates generally to the art of papermaking, and is concerned particularly with the provision of an improved headbox-type stock delivery mechanism, especially adapted for use in conjunction with Fourdrinier papermaking machines, and an improved method of operating such equipment. This application is a continuation of our prior application Serial No. 118,744, which was filed on September 30, 1949 (now abandoned), and our prior continuation-in-part application Serial No. 252,214, which was filed on October 20, 1951 (now abandoned). Both of these prior applications are assigned to the assignee of the present application.

The headbox-type stock delivery mechanism used in conjunction with Fourdrinier papermaking machines ordinarily comprises a relatively large, box-like structure arranged to receive the stock or furnish from a suitable source and to deliver that stock to the web-forming region on the Fourdrinier wire under a velocity such that the web-forming operation is made possible. Usually this requires that the stock within the headbox be delivered or spouted onto the wire at a velocity which is approximately equal to the velocity of the wire. Flow of stock out of the headbox and onto the wire is controlled by means of a horizontally-extending plate member, or slice, which is disposed transversely of the machine and which is adjustable to vary the depth of the flowing stream of stock passing out of the headbox chamber.

The headbox, in addition to serving as a velocity regulating means, is supposed to accomplish the additional function of equalizing and stabilizing the flow of stock so as to assure uniform mass and energy distribution and delivery of fiber across the machine width, while, at the same time, preventing flocculation of the fiber. Additionally, the headbox is supposed to control the stock flowing therethrough in such a manner that the fibers are delivered to the web-forming region on the wire in a heterogeneous arrangement at the various operating speeds of the papermaking machine.

It has long been known that existing headbox structures are subject to a number of serious deficiencies and fall far short of accomplishing their intended functions, despite the many attempts that have been made to overcome the deficiencies of those structures. The principal object of the present invention, therefore, is to provide an improved headbox structure and mode of operation which shall avoid the operational and other difficulties which have heretofore been experienced.

A further object of the invention is to provide improved apparatus and operational procedures in accordance with the principal object of the invention which can be readily incorporated into known stock delivery structures to effect substantial improvement in the operation of such structures.

Other objects of the invention include the provision of improved structural and mechanical mechanisms for use in conjunction with paper machine headbox structures which make possible more accurate and more convenient control of the slice or slices which constitute a part of the headbox structure and to facilitate the cleaning and servicing of the machine during shut-down periods.

The invention is based, in large part, upon the discovery that better formed paper products can be made and greatly improved operation of headbox-type papermaking machines can be accomplished provided that certain definite conditions are maintained in the flowing stream of stock which passes through the headbox and is delivered thereby to the web-forming region on the wire. We have discovered that improved formation is attained when the stock flowing into and through the headbox is maintained under dynamic conditions of controlled fine-scale turbulence. This requires one or more turbulence generating and/or regenerating zones within the system.

To attain the desired dynamic condition of controlled fine-scale turbulence in the stock in accordance with this invention requires passing the stock into and through the headbox as a low-level, rapidly flowing stream. Ordinarily, this requires the use of a pressurized-type headbox; controlling the turbulence conditions existing in the stream of stock which flows through the headbox by the use of one or more partially submerged turbulence generators and regenerators disposed in the path of stock flow, certain specific types of structures having a special advantage for this purpose; causing the stock to flow out of the headbox through a flow passageway of particular shape and dimensions and with the contraction ratio of the flowing stream, i.e., the ratio of the maximum depth of the stream flowing through the headbox to the depth of the stream passing out of the headbox under the outlet slice, maintained within a certain definite range; controlling the turbulence in the stream of stock emerging from beneath the wire slice within certain defined limits; controlling the various elements within the ponding chamber which might create non-uniformity within the stock flowing through the headbox; and preventing the generation of gross secondary motion within the headbox in the region of the discharge opening by control of the dimensions and form of the headbox chamber in that region. In addition to these more basic considerations, further improvement in the operational characteristics of the headbox structures of this general type can be obtained by controlling the turbulence conditions within the stream of stock being delivered to the headbox.

Since papermaking machines in general require uniformity and stability in the stock delivered to the web-forming region, certain of the features of this invention are adaptable to various forms of papermaking machines in addition to those specifically disclosed.

Certain exemplary structural arrangements particularly adapted to effect operation in accordance with the invention are illustrated in the accompanying drawings and will be hereinafter described.

In the drawings:

Figure 1 is a side elevational view partially in section of a headbox and certain of the adjacent structure at the wet end of a headbox-type Fourdrinier paper-making machine;

Figure 2 is a fragmentary, bottom plan view of a portion of the hinged closure for the upper portion of the ponding chamber illustrated in Figure 1;

Figure 3 is a fragmentary, enlarged, end elevational view partly in section, showing additional details of the hinged closure for the upper portion of the ponding chamber;

Figure 4 is a diagrammatic view showing the general relationship of the headbox, the screens, and the delivery trough or conduit which conducts the furnish from the screens to the headbox;

Figure 5 is an enlarged sectional view of the portion of the stock conduit system immediately preceding the flow spreader and the headbox illustrated in Figure 1;

Figure 6 is a transverse sectional view on the general line 6—6 of Figure 5;

Figure 7 is an enlarged sectional view illustrating certain of the details of the slice mechanism and the stock discharge region of the headbox structure illustrated in Figure 1;

Figure 8 is an enlarged sectional view showing additional details of the slice mechanism;

Figure 8A is a fragmentary sectional view generally similar to Figure 8 illustrating a modified form of turbulence generator adjacent the wire slice Figure 9 is a schematic view showing the general arrangement of a level and pressure control mechanism such as may be embodied in the apparatus illustrated in Figure 1;

Figure 10 is a fragmentary sectional view showing another type of turbulence control mechanism for use in the stock delivery conduit of apparatus of the general type illustrated in Figure 1;

Figure 11 is a fragmentary sectional view of the inlet portion of another type of headbox structure, which structure is provided with means for effecting localized, across-the-machine adjustment of the throttling slice;

Figure 12 is a fragmentary view on the general line 12—12 of Figure 11;

Figure 13 is a side elevational view partially in section of another type of headbox structure arranged to operate in accordance with the principles of the present invention;

Figure 14 is a sectional view of still another type of headbox structure arranged to operate in accordance with the present invention;

Figure 15 is a graph illustrating certain of the operational features of a papermaking machine which is equipped with a headbox and a throttling and flow-evening mechanism in accordance with the invention;

Figure 16 is a diagrammatic sectional view of the web-forming and inlet end of a pressure inlet type Fourdrinier papermaking machine which is provided with certain turbulence control means in accordance with the present invention; and Figure 17 is a diagrammatic sectional view of another form of headbox-type papermaking machine provided with certain turbulence control means in accordance with the present invention.

The particular headbox structures illustrated in Figures 1 through 15 of the drawings are intended for use in conjunction with ordinary or standard type Fourdrinier machines, i.e., Fourdrinier machines of the type wherein the stream of stock from which the web is formed is at atmospheric pressure during the web-forming operation, that stream having been caused to flow out of the headbox onto the upper surface of the moving, horizontally-extending Fourdrinier wire downstream of the slice at a velocity approximately equal to that of the wire. This is in contrast with the so-called "pressure type" Fourdrinier machines (illustrated in Figure 16), wherein at least a substantial percentage of the white water from the stock is forced through the wire under pressure before the wire passes downstream of the slice.

Various embodiments of the invention are illustrated in the drawings, a particularly suitable arrangement being that of Figure 1. Although subsequent figures show simplified forms of the invention, Figure 1 will be initially described so as to present most of the aspects of the invention.

In the apparatus illustrated in Figure 1 of the drawings, a breast roll and a Fourdrinier wire of conventional design are shown at 11 and 13. It will be understood that the machine will include the usual deckles, for confining the stock to the wire, suction boxes, presses, felts, driers, and the other additional apparatus which is required in the manufacture of paper.

The defining walls of the headbox structure are fabricated of suitable angle, beam, and plate sections, conveniently by welding, and the entire apparatus is supported in cooperative relation to the wire, breast roll, and other machine elements by means of suitable steel and concrete pillars or beams, as illustrated at 15 and 17. Essentially, the headbox comprises two rigid, vertically-extending side elements 19, commonly designated "pond sides," which are fastened to each other by a bottom section 21 and an end wall 23, both the bottom section 21 and the end wall 23 extending completely across the stock inflow end of the headbox. To further strengthen the structure, the upper ends of the pond sides 19 are connected by a stiffening member 25 which may be circular in cross section.

The stock or furnish, which terms are intended to include the various suspensions of papermaking fiber, water, fillers, dyes, sizes, and other additives used in the papermaking art, is delivered to the inflow end of the headbox through a generally rectangular trough or conduit 27, and this conduit includes a throttling and flow-evening mechanism, further illustrated in Figures 5 and 6, which mechanism is also used to effect control of the turbulence conditions existing in the stream of stock delivered by the flow conduit to the headbox. The conduit 27 connects to a suitable source of stock, for example, the discharge end of a series of Bird type screens, as shown at 29 in Figure 4.

The discharge end 31 of the stock delivery conduit 27 in the illustrated structure is rectangular in outline having a width which in the illustrated embodiment may be about one-fourth the width of the machine, and is adapted to connect with the inflow end 33 of a vertically-disposed flow spreading conduit 35. The flow spreading conduit 35 is adapted to widen the relatively narrow stream of stock delivered by the stock supply means to the full width of the headbox, which dimension is equal to the width of the machine. The flow spreading conduit 35 may desirably include flow control members (not shown) such as are illustrated and described in the patent to Lee, Patent No. 2,684,690. The upstream surface of the flow spreading conduit 35 is defined by a plate member 37 which extends transversely across the headbox and the machine. The downstream surface of the flow spreading conduit 35 is defined by one surface of a vertically-adjustable throttling slice 39. The throttling slice 39 is a hollow, completely enclosed, fabricated, box-like structure which extends across the headbox and is supported for limited vertical and horizontal movement relative to the pond sides 19 of the headbox. The lower surface 41 of the throttling slice cooperates with the adjacent surface 43 of the headbox bottom to define a generally wedge-shaped passageway 45 which is of uniform cross-sectional outline, and of uniformly increasing cross-sectional area in the downstream direction, across the entire width of the machine. The passageway 45 serves to conduct the stock which is delivered to the headbox at predetermined pressure via the flow spreading conduit 35, into the ponding chamber 47 within the headbox proper.

The defining walls of the ponding chamber 47 which receive and hold momentarily the flowing stream of stock passing into and through the headbox are defined by the sides 19 and the bottom 21 of the headbox, the downstream surface 49 of the throttling slice 39, a hinged top or cover unit 51, and the upstream surface 53 of the discharge or wire slice 55. The wire slice 55 constitutes a hollow, fabricated, box-like structure which is supported for limited vertical movement within the headbox by means of suitable projecting guides 57 arranged to engage guide slots 59 in the pond sides 19. If desired, the wire slice may be modified in ways which are well known in the art so as to provide for limited horizontal movement in addition to the above described vertical movement.

The throttling slice is supported on the side walls 19 of the headbox by means of two pairs of cooperating, parallel bar linkages 61, as illustrated in Figure 1. Each of the parallel bar linkages 61 is pivotally attached to the adjacent side wall 19 of the headbox by a rigid pivot 63, and each is connected to the throttling slice 39 by a stub shaft 65, which is rigidly attached to the slice body so as to project through an arcuate slot 67 provided in the side wall 19 of the headbox. The throttling slice 39 is thus supported so as to be movable in both the horizontal and the vertical direction, the path of movement being defined by the parallel bar linkages 61. During normal operation, it is contemplated that the vertical movement of the throttling slice 39 will probably not exceed about 2 inches in either direction which means that the horizontal movement of the slice 39 during normal operation is very small.

The parallel bar linkage supports 61 have the important advantage that the throttling slice 39 can be lifted up and away from the flow spreader portion of the apparatus a very substantial distance, for example, in one commercial embodiment of the invention, where the width of the Fourdrinier wire is approximately 220 inches, the parallel bar linkages 61 are approximately 18 inches between centers, and as a result, the slice body can be moved away from the end wall 23 of the headbox and the flow spreader conduit 35 a distance of about 16 inches, which is ample to permit easy access to the flow conduit for inspection and cleaning. This general concept is one of the important features of the invention and it will be evident that its accomplishment is not limited to the specific support means disclosed.

To provide convenient movement and adjustment of the throttling slice, the apparatus includes a pair of power-operated lift units 69, each of which is connected to the slice body by a suitable lift rod 71 and a yoke and pin connection 73. The two lift units 69 are connected to operate in unison by a suitable cross shaft 75 and each includes a screw mechanism, whereby operation of the power units will move the lift rods 71 simultaneously so as to raise or lower the entire slice structure. The two lift units 69 are pivotally supported, as illustrated, in order that they may accommodate themselves to the swinging movement of the slice produced by the support linkages 61, and the mechanical interconnection of the mechanisms assures uniform raising and lowering of the slice at all times.

Since adjustment of the throttling slice 39 during operation of the machine is rather critical, the apparatus desirably includes means for taking up play and guiding the parallel bar linkages 61, thereby assuring the maintenance of a satisfactory seal between the defining wall surfaces of the flow spreading conduit 35 during adjustment of the throttling within the normal operating range. One such means which includes slidable wedge members 77 and guides 78, is illustrated in Figure 1, but will not be described in detail, since various mechanical means for accomplishing the locking of the linkages 61 can be used.

The upstream surface 53 of the discharge or wire slice 55 is defined by a pair of formed plate members 79 and 81 extending completely across the machine, those members being supported on the slice body by suitable support members such as are illustrated generally at 83 and 85 in Figure 8. The lower portion of the plate member 79 slopes backwardly in the direction of the inflow side of the headbox, and merges smoothly into the upper portion of the plate member 81 which is inclined at a much less acute angle from the vertical. The arrangement defines a flow passageway at the outflow side of the headbox which is of particular shape and construction, and as will be hereinafter pointed out in detail, this is an important feature of the invention, especially in preventing the generation of gross secondary motion, for example, gross, vertically-disposed vortices, within the stream of stock passing out of the headbox, and in the attainment of a gradual acceleration of the stock as it approaches the wire 13.

A pair of spaced-apart, power-actuated lift units 87, each of which is connected to the slice structure 55 by a suitable lift rod 89 provides convenient means for adjusting the discharge slice mechanism. The lift units 87 are connected to operate in unison by a suitable cross shaft 91 and each includes a screw mechanism whereby operation of the power units will move the lift rods 89 simultaneously so as to raise or lower the entire slice structure.

One or more turbulence generators or regenerators, such as the power-driven, rotatable distributor rolls illustrated at 93, are provided within the ponding chamber. It is desirable that each roll 93 shall be supported by means which permits adjustment of the roll within the ponding chamber to produce optimum operating conditions. The drive mechanism for each of the rolls should be capable of driving each roll, independently of any other roll or rolls which may be used, at a predetermined speed which can be adjusted over a reasonable range during operation of the apparatus. The rolls 93 are preferably driven in the directions indicated by the arrows in Figure 1, however, in certain cases, the direction of rotation of one or more of the rolls may be reversed. As will hereinafter appear, the distributor rolls are desirably of a special design in that the spaced openings which are provided in the roll shell are individually substantially less in area than is customary in headbox distributor rolls. The headbox structure also includes suitable seals 95 on either side of the ponding chamber 47 for engaging the surface of the wire in the region of the wire slice 55.

It should be understood that it is possible to generate or regenerate the desired conditions of fine-scale turbulence within the stream of stock flowing through the ponding chamber by the use of various types of apparatus other than the distributor rolls 93. Other forms of turbulence generators and regenerators suitable for the purposes of the present invention include rod rolls, baffles, rotating discs, a series of aligned rods extending across the ponding chamber, etc. The use of one form of such alternative turbulence regenerator is illustrated in Figure 8A. In that view, a series of aligned, uniformly-spaced rods 94 extend transversely of the ponding chamber adjacent the wire slice 55. The rods 94 may be supported in any suitable fashion to the walls of the ponding chamber (not shown). The diameter and spacing of the rods 94 are important in the attaining of the desired turbulence regeneration. When both the diameter and spacing of the rods are approximately ½ inch, satisfactory results will normally be attained at the usual operating speeds of the machine.

The hinged cover unit 51 for the ponding chamber coacts with the other elements of the headbox structure to completely enclose that chamber, except for the stock inflow opening, the stock outflow opening, and openings which are required for a level control system which will be hereinafter described. The hinged cover unit 51 includes a cover plate 97 which extends the full width of the machine. The cover plate 97 is pivotally supported by a plurality of hinge connections 99, each of which is, in turn, supported upon a rectangularly-shaped bar member 101 of hollow construction, which extends across the ponding chamber 47 and is affixed at either end thereof to the side walls 19 of the headbox. The upstream end of the cover plate 97 is hingedly connected to the throttling slice by means of a second transverse bar member 103 which is attached to the adjacent surface of the slice body, and a plurality of lost motion hinge members 105. To facilitate cleaning and inspection of the ponding chamber, the cover plate is provided with one or more access openings, as indicated generally at 107.

To provide an air-tight seal between the hinge cover plate 97 and the adjacent slice bodies, flexible sealing members 109 and 111, desirably fabricated from flat sheets of stainless steel, are attached across the hinged connection between the upstream edge of the cover plate 97 and the throttling slice 39 and across the gap between the downstream edge of the cover plate 97 and the wire slice 55. The sealing members extend completely across the space between the sides 19 of the ponding chamber, and the end edges thereof may be provided with channel-shaped sealing strips 113 of rubber or other resilient material for engaging the surfaces of the pond sides to obtain an air-tight seal, as shown in Figures 2 and 3. The distance between the centers of the hinge connections 99 and 105 is desirably equal to the effective length of the support links 61 for the throttling slice 39 in order that the cover plate 97 and the slice 39 may move as a unit during use of the machine. In fact, unless this relative proportioning is generally followed, it is not possible to use a direct pivot connection between the throttling slice and the pond cover.

In the illustrated structure, the throttling slice 39, wire slice 55, and the cover unit 51 for the ponding chamber 47 must be moved relative to the pond sides 19 during operation of the machine. As a result, it has been found very desirable to provide seal means for preventing leakage around engaging surfaces of the movable slices and the other portions of the machine. Conveniently, this means comprises an O-ring tube type seal, which outlines the various regions in which leakage might be obtained, and certain of the features of the seal means are illustrated in various of the figures of the drawings.

The general path of the O-ring tube seals which are provided over the end faces of the throttling slice 39, the cover plate 97, and the wire slice 55 is indicated in Figure 1 by the dot and dash lines 115, 117, and 119, and portions of the actual seals are illustrated at 121, 123, and 125 in Figures 2 and 3. It will be understood that the sealing arrangements disclosed are illustrative arrangements and that other types of seals can be used. The O-ring tubes are preferably designed to permit inflation of those tubes by air or other fluid, if desired, during operation of the machine, although the pressures usually encountered in a headbox machine are such that the seal produced with uninflated tubes can usually be used with good success.

In the operation of apparatus in accordance with the invention, the control of the depth of the flowing stream passing through the chamber is of great importance in attaining the objectives of the invention. A number of mechanisms can be used for this purpose, for example, the mechanism shown in the patent to Hornbostel, Patent No. 2,509,822. A particularly suitable mechanism having important operational advantages is illustrated in detail in Figure 9. As shown, the mechanism includes a horizontally-extending air inflow tube 127 and a horizontally-extending air outflow tube 129. In order that the control of the depth be accomplished with the minimum possible disturbance of the stock contained within the ponding chamber, the air inflow tube 127 and the air outflow tube 129 each comprise a closed conduit having a plurality of spaced orifices in the upper surface thereof as indicated at 131, and the tubes are arranged in close proximity to each other in the upper portion of the ponding chamber. The tubes 127 and 129 thus accomplish an air diffusion function and this, in combination with the close spacing and the positioning of the tubes within the upper portion of the ponding chamber, effectively prevents any disturbance of the surface of the stock within the ponding chamber as a result of the flow of air into and out of that chamber.

The air inflow and air outflow tubes 127 and 129 are attached to and supported by the sides 19 of the ponding chamber. The air inflow tube 127 is connected to a source of pressure air or equivalent gas through a pipe or conduit 133. The source of pressure air is desirably of a constant pressure type, or the pipe 133 may include an adjustable pressure-regulating unit, as indicated at 135. The air outflow tube 129 is connected to the upper end of a cylindrically-shaped auxiliary tank or receiver 137 through a pipe 139. The auxiliary tank or receiver 137 is supported adjacent one of the pond sides 19 with the bottom of the tank adjacent or below the bottom of the ponding chamber 47.

The auxiliary tank or receiver 137 should have a vertical dimension which is greater than the depth of liquid which is to be maintained within the ponding chamber. The lower end of the receiver 137 is connected to the interior of the ponding chamber 47, adjacent its bottom by a pipe or conduit 141, and for drain and clean-out purposes, the bottom of the receiver 137 is adapted to be connected to a stock return 143 via a conduit 145 which is provided with a shut-off valve 147 as shown.

Extending through the upper defining wall of the receiver 137 is a combination air and liquid discharge line 149 which is also adapted to empty into the stock return, and which may also be provided with a shut-off valve as shown at 151. The discharge line passes into the receiver 137 through a sliding gland connection, indicated generally at 153, by means of which it is possible to raise or lower the discharge tube 149 relative to the bottom of the receiver 137. The inlet end 155 of the discharge line is desirably cut at an angle in order to facilitate the simultaneous discharge of air and liquid therethrough as will be hereinafter described.

The control apparatus illustrated in part in Figure 1 and more completely in the diagrammatic view in Figure 9, is operable to maintain the stock within the ponding chamber 47 at a predetermined level which may be independent of the pressure at which the stock is maintained. Under normal operation, the stock pressure will be related to the speed of operation of the papermaking machine and will be determined by the pressure at which the stock is delivered to the ponding chamber 47. Under this type of operation, the stock pressure is regulated to a predetermined value by adjustment of the stock supply pressure in the stock delivery conduit 27 and to a lesser extent by adjustment of the throttling slice 39.

More specifically, the operation of the level control mechanism of the apparatus under the usual operating conditions is as follows:

Stock reaches the interior of the ponding chamber 47 via the flow spreading conduit 35 and the passageway 45 at a predetermined pressure. The level at which the stock is maintained within the ponding chamber is controlled by the position of the inflow end 155 of the stock and air discharge line 149, and by virtue of the adjustable support for that line, provided by the gland connection 153, the stock level can be adjusted to any predetermined value within the dimensional limits of the receiver chamber 137. Air is supplied to the enclosed ponding chamber 47, through the air inflow pipe 133 and the air inflow tube 127, at a pressure which should be at least somewhat greater than the pressure at which the stock is delivered to the ponding chamber 47. This air is free to flow outwardly from the air inflow tube 127 into the interior of the ponding chamber 47. By virtue of the use of the spaced-apart air discharge openings 131 in the inflow tube 127, which openings are arranged to discharge upwardly against the cover unit 51 for the ponding chamber 47, the air inflow into that chamber will be well diffused and will not produce flow disturbances at the surface of the stock flowing through the ponding chamber.

Pressure air may also flow out of the ponding chamber 47 and into the receiver 137 by way of the outflow tube 129 and the pipe 139 (see Figure 9). Stock is free to flow into the receiver 137 through the conduit 141, the valve 147 being normally closed. The valve 151 in the discharge line 149 is normally open, and hence, the line 149 is available to discharge air or stock or both from the receiver chamber 137 into the stock return and air vent 143.

When the level of the stock within the ponding chamber 47 is at the predetermined height, a condition of balance will exist. Sufficient pressure air will flow into the ponding chamber to balance leakage and to provide at least a small excess which is discharged through the air outflow tube 129. There will also be some flow of stock from the ponding chamber 47 into the receiver 137 via the conduit 141, since under balance conditions, there is desirably a small continuous discharge of both stock and air from within the receiver 137 via the discharge line 149.

If the level of the stock within the ponding chamber 47 drops below the level at which it is to be maintained, the stock level within the receiver 137 will also drop. This will result in an increase in the area of the opening at the inlet end of the discharge line 149, through which air can be vented from the receiver 137, and air will be discharged at an increasing rate through the discharge line 149. At the same time, the rate at which stock is being discharged will decrease. The increased discharge of air will result in a lowering of the pressure within the ponding chamber 47, and that will be accompanied by a rise in the level of the stock within that chamber. As the stock level rises, it will progressively close off the opening into the discharge line 149, and in a very short interval, a balance will be reached, at which time some air and some stock will again be discharged simultaneously through the discharge conduit 149.

If the stock level rises above the selected value, the operation will be substantially reversed. The rising stock will reduce or completely shut off the normal flow of pressure air out of the receiver 137. That will cause the air pressure within the ponding chamber 47 to increase with resulting lowering of the stock level to the selected operating level.

The apparatus is operable to maintain the level of stock within very close limits. At the same time, by virtue of the manner in which the pressure air is introduced into the ponding chamber 47 and the manner in which stock and air are discharged from that chamber, there is substantially no tendency for surface or sub-surface disturbance of the flowing stream of stock which is contained within the ponding chamber. The mechanism is simple and entirely fool-proof in its operation, and it completely eliminates the difficulties which are inherent in the prior pressure and level regulating mechanisms, especially when an attempt is made to use those mechanisms to control the depth of a low-level stream of stock.

The lower surface of the ponding chamber 47 which is defined by the upper surface 157 of the headbox bottom 21, is flat, and includes an apron plate 159 which is shown particularly in Figure 8. This apron plate terminates in a tapered lip section 161, and the position of the lip 161 may be adjusted in fore-and-aft direction by the use of removable spacer bars of suitable dimensions, one of which bars is illustrated at 163.

Under normal operating conditions, the end of the lip 161 is preferably located at approximately the vertical center line of the breast roll 11. It will be understood that at low operating speeds a flexible apron or apron lip may be used, if desired.

The lower surface 41 of the throttling slice 39 which cooperates with the inclined bottom surface 43 to define the stock inflow passageway 45 is flat throughout its length, except for curved sections at the upstream and downstream ends thereof, as shown in Figure 1. The surface 165 at the upstream or lip section of the slice 39 is substantially concentric with the cylindrical surface 167 at the outflow end of the flow spreader 35. The other surface 169 at the outflow end of the slice body is a cylindrical section of about the same radius as the cylindrical surface 167 at the outflow end of the flow spreading conduit 35. The flat surface 41 connecting the two curved surfaces 165 and 169 is inclined to the horizontal at an angle of about 30°, and the divergence angle α encompassed between that surface and the underlying flat surface 43 which constitutes the bottom of the wedge-shaped passageway 45 is equal to approximately 7°. In order to obtain turbulence control in accordance with the invention, the divergence angle α of the expanding cross-sectional passageway 45 is preferably within the range of from about 6 to 9°, with a maximum permissible range of from 3 to 15°. It is also desirable that the length of the passageway 45 shall be at least five times the depth at its inflow end, with a length of from 10 to 15 times the depth being preferred.

As previously pointed out, the wire slice 55 is of particular importance in accomplishing the objectives of the invention, especially in that the defining surfaces of the body of the wire slice determine the outline and dimensions of the passageway 171 through which the stock is discharged from the ponding chamber 47. The extreme lower edge of the wire slice 55 is normally located upstream of the tip of the lip 161 a distance of from approximately ¼ to ¾ inch. The body of the wire slice 55 also defines the geometry of the outflow side of the ponding chamber, which, as previously pointed out, is of particular importance in eliminating gross secondary motion in the stock leaving the ponding chamber.

As shown particularly in Figures 1 and 8, the upper section of the plate member 79 serves as a cover for the underlying, inwardly-projecting portions of the slice structure. This permits the complete enclosing of the slice body, and is important from the viewpoint of keeping the interior of the headbox clean during operation of the apparatus.

If desired, the structure may include an internal shower for spraying the headbox walls so as to prevent any accumulation of fiber or other material therein. In the illustrated mechanism (see Figure 1), this shower comprises a perforated shower pipe 173, supported on brackets 175, attached to the pond sides, and connected to a suitable source of water or other shower fluid. In the operation of internal showers in low-level headbox apparatus in accordance with the invention, it is of very great importance that the temperature and pH of the shower water shall be maintained as nearly equal to the temperature and pH of the stock as is possible. If this is not done, imperfect mixing of the stock and shower water will occur, with possible intermittent channeling of the shower water at localized points across the machine.

Referring to Figure 8, it will be seen that the wire slice 55 includes a transversely-extending slice bar 177 which is supported for limited vertical movement relative to the slice body by means of suitable guides 179 and 181, integrally attached to the slice body. The lower portion of the bar 177 is tapered to provide a lip 183 which determines the depth of the stream of stock which is discharged onto the wire 13. The arrangement also provides a vertical surface 185 of controllable dimensions at the exit end of the stock discharge passageway 171.

The surface 185 is a valuable feature of the invention and is provided for effecting a final regeneration of fine-scale turbulence in the stock and for interrupting the upper boundary layer of the flowing stream of stock which is being discharged from the headbox ponding chamber 47 at the region where that stream of stock is discharged onto the wire 13. Although the surface 185 is illustrated as a vertical surface, it may be inclined slightly downwardly in the downstream direction, the important considation being an abrupt change of direction from the surface 81. The angle between the surface 81 and the surface 185, the angle β in Figure 8, should generally be within the range of from 110 to 150° with an angle of 110° preferred at operating speeds of about 1500 to 1700 feet per minute. By so interrupting this boundary layer, the gross instabilities which grow from that layer tend to be broken up and it becomes possible to attain greatly improved control of the mass flow uniformity emerging from the slice.

The actual dimensions of the vertical wall 185 provided by the slice 55 are of very great importance. When operating under normal operating conditions in accordance with the invention, this wall should have a vertical dimension, the dimension E of Figure 8, which is greater than ½ inch, but preferably not more than about 1½ inches. The adjustment of the dimension E is an important control factor. The figure of ½ inch as the minimum value for the dimension E is selected because for values less than ½ inch, the adjustment becomes so sensitive because of the very small change involved that it is almost impossible of establishment. Above 1½ inches, undesirable flow disturbances may result, and hence, the useful range is approximately ½ inch to 1½ inches.

As has been described, the entire slice 55 is vertically adjustable by means of the spaced, power-operated lift units 87 connected to the upper end of the slice structure. The slice bar 177 is adjusted independently of the slice body, by means of a series of spaced-apart, adjusting screws 187. Each of the adjusting screws 187 is pinned to the slice bar and is movable independently of the other screws by a reversible ratchet mechanism 189 (Figure 7). By tightening or loosening the screws 187, it is possible to effect adjustment of the slice lip 183 so as to increase or decrease the vertical surface 185 at the upstream edge of that member, and it is also possible to effect slight, localized warping of the slice bar so as to produce localized variation in the dimensions of the stock outflow opening. This latter adjustment is sometimes of importance in the control of the weight of the web across the machine and/or to correct for deflections of various portions of the headbox.

As previously stated, the geometry of the defining walls of the ponding chamber 47 in the region of the stock discharge opening is such as to attain a gradual acceleration of the stock as it approaches the outlet opening and such that the generation of secondary motion within the stock capable of being carried out of the ponding chamber during operation of the apparatus is effectively prevented, despite the fact that the stream of stock within the ponding chamber may have a depth no greater than four inches, and may be flowing at a relatively high velocity. The accomplishment of this requires the provision of a surface such as the surface 81, which extends transversely across the machine at an angle to the horizontal, the angle $\gamma$ in Figure 8. This angle is preferably approximately 45° at operating speeds below 1000 feet per minute and should be smaller if the operating speed is increased with the angle $\gamma$ being approximately 20° for an operating speed between about 1500 to 1700 feet per minute.

When a partially submerged distributor roll, positioned in fairly close proximity to the stock discharge passageway, is utilized as a turbulence generator, the vortex controlling surface, which conveniently comprises a portion of the upstream surface of the slice, must be inclined and must extend into close proximity to the roll surface along a line which is at least approximately coincident with the stock level. Since, in general, the most effective turbulence conditions will be attained when the distributor roll is operated with the stock level at a depth which is equal to from about ½ to ¾ the roll diameter, this means that the vortex controlling surface will rarely be inclined less than about 15° from the vertical.

The contraction ratio produced in the stream flowing through the headbox, i.e., the ratio of the average depth of the stream within the headbox, the dimension D of Figures 1 and 8, to the depth of the discharge opening, the dimension $d$ of Figure 8 is as small as possible and in any event does not exceed a ratio of 25. As an example, this means that for a discharge opening having a depth ($d$) of $\frac{7}{16}$ inch, the depth (D) of the stock within the headbox chamber must not exceed approximately 11 inches, or for a 6 inch stock depth within the headbox, the minimum discharge opening would be approximately ¼ inch. The maintenance of this predetermined contraction ratio, particularly when the stock delivery passageway includes a vertical wall or surface adjacent the stock discharge opening, as at 185, assures the delivery of the stock to the web-forming region on the wire under the optimum possible conditions. Particularly, it makes possible the delivery of the stock to the web-forming region without loss, or material reduction, of the condition of fine-scale turbulence which is created within the headbox chamber as a result of the use of a partially submerged distributor roll operating in a low-level, high velocity stream.

The character of the fine-scale turbulence which is produced within the flowing stream of stock contained within the headbox prior to the delivery of that stream to the web-forming region is also an important feature of the invention. In general, it is desired that the flowing stream shall contain a very large number of small vortices, each having a maximum dimension which is about the same as the average length of the individual fibers which are suspended within the furnish. The attainment of fine-scale turbulence of this nature usually involves a flow condition within the flowing stream passing through the headbox wherein the Reynolds number is above about 5,000.

While the control of the turbulence conditions within the flowing stream of stock passing through the headbox and the control of the turbulence conditions in the web-forming region are of particular importance in the practice of the invention, it is possible to simplify somewhat this control problem and to improve generally the operation of headbox apparatus of the subject type by effecting preliminary or initial control of the turbulence conditions in the stock supply system, conveniently in the region immediately preceding the flow spreading operation. In the stock delivery system employed in conjunction with the headbox described in the foregoing, the flow-evening and throttling mechanism, indicated generally at 191, is designed to accomplish control of the turbulence in the stock which is being delivered to the flow spreader. The general relationship of this mechanism to the other elements of the stock delivery mechanism is shown in Figure 4, and certain details of the mechanism are shown in Figures 5 and 6.

Essentially, the mechanism 191 comprises a rigid-walled, rectangularly-shaped conduit section 193, which is closed on all four sides and which serves as an intermediate portion of the stock delivery trough 27. The conduit section 193 is provided at its inflow end with a downwardly sloping baffle 195, which accomplishes acceleration of the stock flow in the region underneath this baffle. A pair of perforated plates 197 and 199 are interposed in the path of stock flow at the downstream end of the inclined baffle 195, and the upper surface of the remaining portion of the flow path through the unit is defined by a second baffle 201, which is upwardly inclined over a substantial portion of its length so as to provide a stock passageway 203, the cross-sectional area of which increases uniformly in the downstream direction. Adjacent the outflow end of the passageway, the baffle becomes vertical, as shown at 205, so as to provide a portion 207 of increased cross-sectional area, and connects with the walls of the conduit 27 through the flanges 206.

The increased cross-sectional area portion 207 of the stock flow passageway through the mechanism is employed as a deaerator section, as will hereinafter appear. The inflow passageway 33 to the flow spreader conduit is of approximately the same cross-sectional area as the stock passageway 203 at the downstream end of the inclined portion of the baffle 201. The inflow passageway 33 is defined by the surface 208 forming the upper end of the flow spreading conduit 35 and the adjacent surface of the end section 23 of the headbox. The vertical baffle 205 and the surface 208 close the deaerator portion 207, as shown particularly in Figures 1 and 5.

Thus, there is provided at 207 a region of expanded, cross-sectional area adjacent the inflow end of the flow spreader conduit 35, and a plurality of pipe sections 209 are connected to the upper end of this expanded area region. The pipe sections are in turn connected to a vacuum manifold 211, which is connected to a source of reduced pressure of such character that the level of the liquid in the portion 207 will normally rise to approximately the lower end of the pipes 209. The application in this manner of reduced pressure to the expanded region of the flowing stream of stock downstream of the flow-evening and throttling mechanism 191 is very effective in preventing the cascading of stock into the flow spreader 35 and in accomplishing the elimination of large air bubbles from that stream, with accompanying improvement in the formation obtained in the web-forming region of the machine.

The perforated plate 199 is fixedly supported in position and the other plate 197 is adapted to be moved vertically, relative to the plate 199 by a hand-operated lift mechanism 213. The amount of vertical movement is limited by a pair of cap screws 215, one of which is located at either end of the movable plate 197 so as to engage a slot 217 formed in that plate, each screw extending into the fixed plate 199. The movable plate 197 is supported by a suitable guideway, not shown in detail, and a seal 219 which may constitute an O-ring tube seal is provided for preventing leakage between the baffle 195 and the movable plate 197 during operation of the equipment.

The operating mechanism for the movable plate 197 includes a pair of tie-rods 221, one of which is integrally connected to either end of the movable plate 197. Each of the tie-rods 221 is threaded at its upper end and is adapted to be engaged by a suitable drive mechanism 223, which may include an integrally threaded gear for engaging the threaded portion of the tie-rod, and a worm drive for that gear, similar to the slice adjusting means. The two drive mechanisms are connected by a shaft 225 (Figure 6) in order that the movable plate 197 may be raised and lowered evenly at either end, without binding. By proper selection of gear and thread ratios, extremely accurate and very even, relative movement of the plates 197 and 199 can be accomplished.

The dimensions of the cooperating openings 227 which are provided in the perforated distributor plates 197 and 199 are of particular importance in producing the desired type of turbulence within the flowing stream which is being delivered to the flow spreading conduit 35. In the manufacture of papers such as tissue, book paper, and newsprint, where the basis weight of the sheet being manufactured is within the range of from about 5# to 180# for 480 sheets 24 by 36 inches, at speeds within the range of from 400 to 3,000 feet per minute and by the use of stock having a consistency within the range of from .05 to 1.0 percent fine-scale turbulence, as the term is used in this application (i.e., turbulence wherein the individual vortices have an average dimension which is not materially greater than the average length of fibers of stock and a Reynolds number of the flowing stream of stock above 5,000), will result if the maximum dimension of the openings is not materially in excess of ½ inch. Turbulence conditions of benefit will also be produced if the openings are as large as 1 inch in maximum dimension, but the use of openings having a maximum dimension greater than 1 inch is definitely not recommended, if anything approaching a condition of fine-scale turbulence is to be produced in the flowing stream of stock being delivered to the flow spreading conduit. The perforated plates 197 and 199 accomplish the further function of evening the flow passing through the flow conduit 27 and the adjustable relationship of the plates makes possible a very accurate, controllable throttling relationship.

In connection with the operation of this apparatus, it should be noted that the use of perforated flow control plates having openings therethrough of the dimensions above specified constitutes a considerable departure from the teachings of the art. Heretofore, it has generally been considered advisable to use as large an opening in distributor rolls and in perforated flow control plates as is possible, and in any event, to avoid the use of openings which are smaller than 1 inch in diameter. Actually, as is above pointed out, the use of these small openings is the very thing which makes possible the attainment of the fine-scale turbulence which is an important objective of the invention.

It is possible to create a condition of fine-scale turbulence within a flowing stream of stock such as is contained within the flow conduit 27 by the use of a rotating distributor roll as well as by the use of perforated plates, and a structure of this type is illustrated in Figure 10. In that view, a hollow shell distributor roll provided with a series of regularly-spaced openings is illustrated in cross section at 229. This roll is supported so as to substantially, completely fill the flow passageway defined by the side walls and bottom of the conduit 27 and the baffles 195 and 201. The apparatus includes means, not shown, for driving the roll at a predetermined, adjustable speed. Except for the substitution of the roll 229, the apparatus is the same as the mechanism illustrated in Figures 1, 5 and 6. Also, as in the previously described mechanism, the cross-sectional dimensions of the holes provided in the shell of the distributor roll 229 are of great importance in the attainment of turbulence conditions in accordance with the invention. Preferably, the maximum dimension of these openings does not exceed ½ inch and in any event, should not exceed 1 inch.

An illustrative roll, used successfully in commercial operations in accordance with the invention, had a diameter of 16 inches, regularly spaced openings ½ inch in diameter with 42 percent of the total surface of the shell being open. This roll, when used in conjunction with a machine manufacturing newsprint at speeds within the range of from 1250 to 1800 feet per minute, with flow velocities through the associated flow conduit of within the range of 48 to 100 feet per minute, and a stock consistency of .75 percent, was rotated at speeds within the range of from 8 to 65 r.p.m.

As previously stated, the primary objective of the present invention is the improvement of the operation of headbox-type stock delivery mechanisms, in order that the flowing stream of stock which is delivered to the web-forming region on the wire shall contain a uniform dispersion of fiber under such dynamic conditions of turbulence and flow that the resultant sheet will be of uniform weight across its width and of uniform physical characteristics. The attainment of this objective involves the elimination of conditions of transient instability within the flowing stream which is passing through the headbox and the avoidance of flocculation or other conditions which might cause uneven fiber dispersion. The invention includes a number of novel structural and operational concepts.

The apparatus illustrated in Figure 1, and further described in the foregoing, embodies examples of certain of these structural concepts and is arranged to operate in accordance with the operational concepts of the invention. Of particular importance in this connection is the discovery that a dynamic condition of fine-scale turbulence should be created in the flowing stream of stock which is flowing into and through the headbox, and that this condition of fine-scale turbulence should be caused to persist into the web-forming region. The desired dynamic condition of fine-scale turbulence is attained by employing multiple-stage throttling with accompanying acceleration of the stock at a plurality of points along the path of flow, whereby regions of fine-grain turbulence and successive improvement in the uniformity of the velocity distribution across-the-machine width are produced at spaced intervals along the path of flow of the stock, with resultant important reduction of fiber clotting or flocculation.

It will be understood that the adjustment of a papermaking machine during normal operation requires the careful correlation of a considerabale number of variables. For example, the composition of the stock or furnish varies with the type of paper being manufactured, and the consistency of the stock is an important, determining factor in fixing the weight of the sheet which is being manufactured. Changes in the composition or consistency of the stock effect corresponding changes in the hydraulic characteristics of the system and require corresponding adjustment of the machine. Changes in operating speed, on the other hand, require the delivery of additional stock to the web-forming region with the minimum possible change in the hydraulic characteristics of the stock delivery system. The structure of the present invention provides a substantially increased number of available controls and thereby makes possible much more efficient overall adjustment of the machine.

For example, in the usual headbox machine, the level of the stock within the headbox can be varied, and the resulting change in head can be used to control, to some extent, the rate at which stock is discharged onto the wire, thereby making possible some variation in the range of speeds over which the machine may be operated, without varying the slice adjustment. However, variation of the level of the stock in the headbox or elsewhere for the purpose of effecting head control alters the hydraulic characteristics of the path of flow of the stock through the headbox unit, and this change usually requires a compensating change in the slice adjustment in order to obtain good formation. Equally objectionable is the obtaining of an increased or decreased discharge rate by adjustment of the slice opening alone, since this requires a change in one of the most critical adjustments of the machine, and it also alters, to some extent, the hydraulic characteristics of the flow path within the headbox.

In contrast with these arrangements, the multiple slice headbox of the present invention, especially in combination with the provision of throttling means in the stock supply system, makes possible very substantial variation in the amount of stock delivered to the wire, and hence, comparable variation in the machine speeds, without substantial alteration in the depth of other hydraulic characteristics of the stream of stock in its path of flow through the machine. To illustrate certain of the advantages of this arrangement, during the operation of a paper-making machine equipped with a headbox and stock supply system in accordance with the invention, the most efficient positions for the wire slice and the throttling slice can be found for a given machine speed and for a given throttling effect in the stock inflow system. In such instances, the head characteristics throughout the machine might be as illustrated in the graph Figure 15, wherein the head in the inflow conduit is illustrated by the horizontal line 228. During the assumed conditions of operation, the adjustment of the throttling means in the stock inflow system might be such as to produce a substantial head loss in the throttling region, as indicated by the vertical line labeled I.

In the remaining portions of the flow passageway through the system, some additional slight head loss will occur in the flow spreading conduit, as indicated by the section of the curve labeled 230, with a further, fairly sharp drop as the flow passes through the throttling opening at the inflow end of the passageway. After passing the throttling opening at the throttling slice and during the flow through the inflow passageway into the ponding chamber, there is some increase in head as the flow evens out, this being illustrated by the section of the curve labeled 332. Additional slight drops in head loss will occur at intermediate points in the ponding chamber as the flow passes through the turbulence regenerators with subsequent increase in head as the flow evens out. Finally, there is a sharp drop as the flow leaves the ponding chamber through the outflow opening formed between the bottom edge of the wire slice and the stationary lip, as indicated by the lower right-hand section 334 of the curve.

As stated, it is assumed that the machine is operating satisfactorily under these conditions. Should it be desired to increase the machine speed, it will be found that the only adjustment necessary is merely the reduction of the throttling effect produced in the stock delivery conduit by the combined throttling and flow-evening unit. For example, the head loss may be reduced at this point to the extent indicated by the vertical lines labeled II and III, with the result that subsequent portions of the flow curves will move upwardly, as indicated on the graph. It will be noted, however, that there is no substantial change in the hydraulic characteristics of the system, subsequent to the throttling opening at the stock inflow region. Accordingly, it is possible to operate a machine equipped with throttling means and multiple slices in accordance with the invention over a wide range of operating speeds, without, for example, any substantial adjustment in the wire slice, this being one of the most critical adjustments on all paper-making machines.

Additional variation in the machine operating characteristics may also be accomplished by movement of the throttling slice, independently of the throttling means in the stock inflow system, and the wire slice. Here again, since the throttling slice may be moved within its normal range of operation without altering the shape of the stock flow passageway, as a result, the hydraulic characteristics of the stock flow path through the system are not disturbed, and a minimum of compensating adjustments are required. Many of the disadvantages resulting from the control deficiencies of the prior arrangements are thereby overcome.

As previously stated, a feature of considerable importance in accomplishing the improved operation of the machine of the present invention is the provision of means for accomplishing successive generation and regeneration of fine-scale turbulence in the stock at a plurality of points along the path of flow of the stock through the machine. These means include the throttling openings provided in the combined throttling and flow-evening unit, the restriction of the flow path at the inflow end of the stock spreading conduit, the throttling opening provided by the throttling slice at the inflow end of the passageway leading from the flow spreader to the ponding chamber, the turbulence regenerating mechanisms within the ponding chamber, and finally, the throttling opening provided between the wire slice and the stationary lip. The successive accelerations of the stock and the successive generation or regeneration of fine-scale turbulence within the stock at these various points is of great assistance in minimizing any tendency for the stock fibers to coagulate or flocculate, and results in greatly improved formation. The successive accelerations also erase any velocity variations which exist in the stream of stock so that when the stream of stock reaches the web-forming region it has a generally uniform pressure and velocity distribution throughout its cross-sectional area. A mechanical feature of particular importance in the disclosed structure is the utilization of the throttling slice as a closure means for one side of the flow spreader conduit. This, in combination with the novel, retractable support means for that slice makes possible convenient access to the interior of the flow spreader conduit, and the headbox for cleaning and maintenance operations. This arrangement makes possible considerable simplification of the overall structure, and especially the stock supply system, and is of particular advantage in instances where the nature of the stock may require frequent cleaning of the apparatus.

In the manufacture of paper of the weights within the range of tissue and book paper, i.e., paper up to a maximum basis weight of about 180# for 480 sheets 24 by 36 inches, by the use of stock consistencies within the range of .05 to 1.0 percent and at speeds within the range of from 400 to 3,000 feet per minute, the practice of the invention requires that the stock shall be conducted through the headbox chamber as a low-level, rapidly flowing stream within which there is created a condition of fine-scale turbulence. More particularly, the stream should not have a depth in excess of 12 inches, and should preferably be within the range of from 4 to 12 inches.

The attainment of the desired conditions of fine-scale turbulence in the stream of stock which is flowing through the headbox is in part accomplished by the use of one or more partially submerged turbulence generators, or regenerators disposed in the path of stock flow. The distributor roll or rolls provided in the apparatus of Figure 1 have openings of much smaller dimensions than have been used heretofore, and in use, one roll is disposed in close proximity to the opening from which the stock is discharged from the headbox to the web-forming region. The actual spacing of the roll from this opening is determined by the requirement that there must be sufficient distance between the roll and the discharge opening that any jets produced by flow through the roll openings will be sufficiently diffused before reaching the discharge opening to prevent the jetting of stock out of the headbox beneath the slice. Normally, this requires that the roll shall be spaced from the discharge or slice opening a distance which is not less than 10 times the minimum dimension of the openings in the roll.

Also required is the delivery of the stock from the headbox chamber under such conditions that the contraction ratio of the stream flowing through and out of the headbox shall not exceed 25, and the provision of means whereby it becomes impossible for large scale or gross secondary motion to be generated within the stream of stock in the headbox chamber and to be carried out of that chamber beneath the slice.

The attainment of this last condition involves the provision of suitable baffle or other means which extend into the space where gross secondary motion would otherwise be generated, and which, by virtue of the closing-off of that space, prevents such secondary motion from coming into being.

A structural feature of considerable importance in accomplishing the delivery of the flowing stream of stock to the web-forming region under the desired conditions of turbulence is the provision of a generally vertical surface of restricted dimensions, i.e., from ½ inch to 1½ inches, when operating under conditions as above described, in the region where the stock passes out of the headbox.

Additional advantages are obtained by control of the turbulence conditions and particularly the generation of a condition of fine-scale turbulence within the flowing stream of stock which is delivered to the inflow side of the headbox.

In the particular apparatus illustrated in Figure 1, the desired low-level in the flowing stream of stock passing through the headbox ponding chamber is accomplished by the maintenance within the headbox of a pad of pressure air which is regulated so as to maintain the depth of stock at a predetermined value which is less than 12 inches. It is an important feature of this means that the pressure air is introduced into the interior of the headbox and is removed therefrom without the creation of flow currents or other surface disturbance in the stream of stock passing through the headbox. The generation of gross secondary motion is prevented by the cooperative relationship of the baffle and the downstream roll, the baffle being so inclined that it extends into fairly close proximity to the surface of the downstream distributor roll, thereby eliminating the spacing within which gross secondary motion might develop. The downstream distributor roll is spaced from the discharge opening formed at the slice lip a distance which is ample to prevent the jets produced by the flow of stock through the openings in the roll shell from carrying over into the stream passing out of the headbox. The fine-scale turbulence conditions created within the headbox is further preserved by the decreasing area passageway, the discharge end of which restricts the contraction ratio in the stream emerging from the headbox to a value of approximately 16. It is important in this connection to note that the gradual acceleration of the flowing stream of stock passing through the headbox within the limits permitted by the stated contraction ratio is of the greatest assistance in maintaining the web-forming region in the fine-scale turbulence conditions created by the action of the partially submerged, small hole distributor rolls. The structure also includes provision for uncovering a portion of the upstream surfaces of the slice lip as illustrated at 185 in order to interrupt the boundary layer of the stream emerging from the headbox, further aiding in the control and attainment of the desired turbulence conditions.

The operation of the flow-evening and turbulence control mechanism constituting a part of the means for delivering stock to the flow spreading conduit has been previously described.

The particular headbox structure illustrated in Figure 1 includes, as has been previously described, a throttling slice which is operable to throttle the flowing stream of stock passing into the headbox from the flow spreading conduit. This throttling effect, together with the increasing area passageway formed between the opposing surfaces of the slice and the headbox bottom, while not of primary importance in the attainment of turbulence control, contributes to the over-all highly efficient operation of the mechanism. This portion of the apparatus can also be utilized with other types of papermaking machines, for example, in a pressure forming type papermaking machine, or in a conventional open headbox type papermaking machine, as schematically illustrated in Figures 16 and 17 respectively.

In Figure 16, there is illustrated a portion of the stock supply conduit system of a pressure forming type papermaking machine. In this figure, the stock is delivered to the stock delivery conduit 238 from a suitable stock or fan pump (not shown). The stock delivery conduit 238 connects with the inflow end of a vertically disposed flow spreading conduit 240 which widens the stream of stock delivered by the stock supply means to the full width of the machine. The upstream surface of the flow spreading conduit is defined by a fixed wall 242 which extends transversely across the machine; however, it may be defined, as in the flow spreading conduit 35 of Figure 1, by one surface of a vertically adjustable throttling slice (not shown). As in the arrangement of Figure 1, the outlet of the flow spreader connects with a generally wedge-shaped passageway 244 which is of uniform cross-sectional outline and of uniformly increasing cross-sectional area in a downstream direction across the entire width of the machine. The passageway 244 connects with an inlet flow conduit 246 which is of uniform cross-sectional area, and this conduit conducts the stream of stock to the web-forming region of the machine, in which region the stock is discharged against and in part through the Fourdrinier wire as illustrated at 248. The wire is supported by the usual breast roll 250 so as to extend across the outflow end of the inlet conduit and the apparatus includes a slice 252 of known type for confining the flowing stream of liquid delivered by the inlet conduit to the web-forming region. The breast roll 250 may be of conventional structure or otherwise and the usual suction boxes 254 or other means will be provided for aiding in effecting drainage of water through the wire during the web-forming operation. The stock delivery conduit 238 may also be provided with suitable throttling and flow-evening means as in the apparatus of Figure 1, if desired. The throttling of the stream of stock emerging from the flow spreading conduit 240 together with the increasing area passageway 244 provides the desired turbulence control and flow-evening required in this system for efficient operation of the machine.

In Figure 17, there is illustrated, the web-forming end of an open headbox-type papermaking machine which is provided with flow spreading and turbulence control means in accordance with the invention. In this machine, the stock is supplied to the headbox by the way of a stock delivery trough 260. The trough 260 connects with the inflow end of a vertically disposed flow spreading conduit 262. The upstream surface of the flow spreading conduit is defined by a plate member 264 which extends transversely across the headbox. The downstream surface of the flow spreading conduit is defined by the rearward defining wall 266 of a vertically-adjustable throttling slice 268. The throttling slice may be a hollow, completely enclosed, fabricated, box-like structure which extends across the headbox and is supported for limited vertical movement relative to the sides of the headbox. The lower surface 267 of the throttling slice 268 cooperates with the adjacent surface 272 of the headbox to define a generally wedge-shaped passageway 274 which is generally similar to the passageway 45 of Figure 1. The forward defining wall 276 of the slice also serves as the rear wall of a vertical conduit 278. The rearward surface of a baffle 280 forms the downstream surface of the conduit 278. The forward face of the baffle 280 also serves as the rear wall of the headbox ponding chamber 282, and the stock flows over this baffle in passing through the headbox to provide the usual circuitous flow path therethrough. A pair of adjustable baffles 284 and 288 are arranged in the path of flow downstream of the conduit 278 and a distributor or rectifying roll 290 may be employed adjacent the headbox outlet as shown. The stock is discharged from the headbox onto a wire, which is indicated at 292, through a suitable throttling slice 294 which may be similar to the throttling slice shown in Figure 1. This form of headbox structure has been found to accomplish very substantial improvement in the uniformity of delivery of the stock to the web-forming region of the machine with resultant improved formation at increased operational speeds.

Under certain conditions of operation, it may be found desirable to effect localized, across-the-machine adjustment of the depth of the flowing stream of stock in the region of the throttling slice, and an arrangement for accomplishing such localized adjustment is illustrated in Figures 11 and 12. In these figures, the throttling slice, which may be exactly similar in construction to the slice 39 in the previously described structures, is illustrated in outline at 231. Also illustrated are portions of the end wall 233 of the headbox and the pond sides 235, the stock inflow passageway 237, which conducts the flowing stream of stock into the ponding chamber, and adjacent portions of the bottom wall 239 of the headbox. It will be understood that the structure includes adjusting means for the throttling slice 231, seals, and the various other elements as described in the foregoing.

In order to accomplish localized across-the-machine adjustment of the depth of the throttling opening, the surface adjacent the inflow end of the flow passageway 237 is defined by a diaphragm-like member 241 of resilient material, such as a molded rubber compound, which extends transversely across the machine. The member 241 is supported by an adjusting mechanism which includes a metal bar 243, rigidly attached to the lower surface thereof, and a plurality of regularly-spaced, screw-adjusting mechanisms 245, which may be similar to the ratchet-operated screw mechanisms used for adjusting the lip of the wire slice 55. The diaphragm member 241 is faired into the flow defining surfaces at the outflow end of the flow spreader conduit 247, and at the inflow end of the passageway 237, as illustrated. It will be evident that adjustment of the screw mechanisms 245, which are spaced at regular intervals across the machine, will effect localized warping of the diaphragm support bar 243, and corresponding, localized changes in the depth of the inflow passageway at the lip of the throttling slice.

A headbox having a cross-flow type stock delivery mechanism which is in accordance with the principles of the invention is illustrated in Figure 13. In that apparatus, as in the structure illustrated in Figure 1, the defining walls of the headbox are fabricated of suitable structural sections and the entire mechanism is supported in cooperative relationship to the wire 249, the breast roll 251 and other machine elements by means of a suitable frame support, indicated generally at 253.

The headbox proper comprises two, rigid, vertically-extending side elements 255 which are fastened together to define a ponding chamber 257 by a bottom section 259 and an end wall 261, both of which extend completely across the headbox. The side elements 255 are connected together by suitable strengthening members, indicated at 263 and by two beam units 265 which also serve as a support for the slice adjusting mechanism.

The slice 267, which is generally similar to the wire slice 55, comprises a fabricated, box-like structure extending completely across the machine and supported for limited vertical movement within the headbox by means of suitable projecting guides 269 arranged to engage guide slots 271 in the pond sides.

The upstream surface of the slice 267 is defined by formed plate members 273 and 275 extending completely across the machine. The plate member 273 slopes rearwardly in the direction of the inflow side of the headbox and extends into close proximity to a partially-submerged distributor roll 277 located within the ponding chamber as shown in Figure 13. The plate member 273 serves, similarly to the plate member 79, to prevent the creation of gross, secondary motion within the stream of stock leaving the headbox during operation of the equipment.

The lower portion of the plate member 273 merges smoothly into the upper portion of the plate member 275 which is inclined at a less acute angle from the vertical. The exposed surface of the plate member 275 cooperates with the underlying surface of the head box bottom to define a flow passageway 279 of decreasing cross-sectional area in the direction of stock flow. As in the previously described structure, the contraction ratio is maintained at a value less than 25.

The slice 267 includes a transversely-extending slice bar 281 which may be exactly similar to the slice bar 177 and which, similar to that bar, is supported for limited vertical movement relative to the slice body by means of suitable guides and a series of spaced-apart, adjusting screws 283. The lower portion of the slice bar 281 is tapered to provide a lip which determines the depth of the stream of stock which is discharged onto the wire 249, and the arrangement is such that the upstream edge of the slice bar may be projected to provide a vertical wall 285 at the exit end of the passageway 279, similar to the wall 185 in the previously described structure.

The bottom 259 of the headbox includes an apron plate 287 having a tapered lip which will normally be positioned at approximately the vertical center line of the breast roll 251, and the structure includes a removable spacer bar 289 for permitting fore-and-aft adjustment in the lip position.

The headbox of the Figure 13 structure is of the pressurized type and during normal operation of the apparatus, is enclosed except for the stock inflow and stock outflow openings. Thus, the walls of the ponding chamber 257 which receives and holds for a short interval of time the flowing stream of stock passing into and through the headbox are defined by the sides 255 and bottom 259 of the headbox, the upstream surface of the slice 267, the end wall 261 of the headbox and a top or cover unit 291.

The cover unit 291 is also of fabricated construction and extends between the two pond sides 255 in the position shown in the drawings. A seal 293 is provided between the downstream edge of the cover and the adjacent surface of the adjustable slice 267. The cover 291 is provided with one or more access openings indicated generally at 295, and it also serves as a support for the air inflow and air outflow units 297 and 299 constituting a part of the pressure and level mechanism control embodied in the apparatus. This mechanism may be exactly similar to the pressure and level control mechanism shown in Figure 9, and will not be described in detail. Also, if desired, the structure may be provided with internal showers similar to that shown at 173 in Figure 1.

In addition to the distributor roll 277 which is disposed adjacent the stock discharge passageway 279, the apparatus may include one or more additional turbulence generators or regenerators within the ponding chamber, for example, the roll illustrated at 301. These distributor rolls, in accordance with the principles set forth in the foregoing, are operated partially submerged and are desirably provided with a series of spaced openings in the periphery thereof which have a maximum dimension not more than 6 times the maximum length of fiber in the stock furnish. This means that for the usual type furnishes used in the manufacture of tissue, book, newsprint, and similar papers, the openings in the shells of the distributor rolls should have a maximum dimension which is preferably about ½ inch and which, in any event, does not exceed 1 inch. The distributor rolls 277 and 301 are driven in the directions shown by the arrows in Figure 13, by suitable, variable speed drive mechanisms in order that the desired turbulence control may be effected. The roll 277 should be closely adjacent the surface of the wire slice but spaced a distance at least equal to 10 times the minimum dimension of the openings in the roll from the stock discharge opening in order to prevent jetting into the slice region.

To provide for convenient, vertical adjustment of the slice, a pair of spaced-apart, power-operated lift units 303, similar to the units 87, are connected to the slice structure. These units are supported upon the beams 265 and are interconnected by a shaft 305 to assure simultaneous operation.

As previously stated, the apparatus of Figure 13 includes a cross flow stock delivery mechanism. This mechanism, representative examples of which are shown in U.S. Patents Nos. 2,347,717 and 2,347,850 to Staege, includes a main stock delivery conduit 307 which is connected to a fan pump or other pressure source for supplying stock, not shown. The conduit discharges into a branched pipe 309 whereby the flowing stream of stock passing through the conduit 307 is divided into two oppositely directed streams of substantially equal size. These two streams are conducted, in turn, by suitable pipe sections 311 and 313 to opposite ends of an elongated flow box structure 315 having a central baffle 317 provided therein. The flow box is so shaped that it defines two interconnected, oppositely tapered flow passageways disposed side by side, as shown in Figure 13 and in the above patents.

The stock is discharged from the flow box 315 into the headbox 257 by way of a rectangular opening 319 which extends completely across the machine, the flow box 315 having a length substantially equal to the width of the headbox. As shown particularly in Figure 13, a distributor roll 321 which comprises a hollow cylindrical shell supported upon suitable stub shaft sections is positioned within the flow box adjacent the discharge opening 319. This roll is used primarily as a flow-evening and flocculation preventing mechanism. The roll 321 is disposed with its lower periphery in close proximity to the central baffle 317 within the flow box and is so positioned relative to the defining walls of the flow box adjacent the discharge opening 319 that a very large proportion of the flow out of the flow box passes through the roll.

In order to effect control of the turbulence conditions existing within the flowing stream of stock and, in particular, to provide a condition of fine-scale turbulence within the stream of stock being delivered to the headbox at the point where that stream enters the headbox ponding chamber 257, the apparatus includes a pair of adjustable, perforated plate units 323 and 325 which may be exactly similar to the adjustable plate units 197 and 199, illustrated in Figures 5 and 6. Also, similar to those units, the structure is provided with a hand-operated lift mechanism 327, which includes a pair of spaced drive units 329, each of which engages a threaded rod 331 attached to the movable plate 323. The structure includes a suitable guide and stop mechanism, not shown in detail, similar to the previously described structure.

The maximum width of the openings 333 provided in the cooperating plate members should not be materially in excess of ½ inch in order to maintain the proper fine-scale turbulence in the flowing stream of stock being conducted into the headbox.

During operation of the apparatus, stock flows into the headbox chamber 257 by way of the cross-flow evener mechanism and the cooperating, perforated plate units 323 and 325 which are provided for the attainment of turbulence control in the stream of stock as it passes into the headbox. The level regulating means is operable to maintain the level of the flowing stream of stock passing through the headbox at the desired value. The pressure within the headbox is determined by the pressure existing in the stock supply system, and this pressure should be sufficient to produce a spouting velocity in the stock discharged onto the wire which approximates the wire speed. As in the previously described structure, the flowing stream of stock should have a depth which is not in excess of about 12 inches and which is preferably within the range of from about 4 to 12 inches.

Preferably, the level control mechanism should be of a type, such as the structure shown in Figure 9, which effects flow of air into and out of the headbox by a diffusion operation, thereby eliminating any possibility of the creation of objectionable flow currents at the surface of the stream of stock passing through the headbox chamber. The dimensions of the distributor rolls 277 and 301 are such that they are operated partially submerged, and the defining surface of the slice at the downstream side of the headbox chamber 257 extends into close proximity with the roll 277, as previously described, so as to prevent the creation of gross, secondary motion within the stream of stock.

The slice bar 281 is adjusted to fix the height of the vertical surface 285 at the discharge end of the stock discharge passageway within the range of from ½ to 1½ inches, and this adjustment may be varied in order to assure interruption of the boundary layer of stock being discharged from the headbox and the avoidance of the instability conditions which might otherwise result. Thus, the stock flows into and through the headbox as a low level, rapidly flowing stream wherein there is maintained a condition of fine-grain turbulence which carries through into the stream of stock contacting the wire. The contraction ratio, i.e., the ratio of the depth D of the flowing stream of stock within the headbox to the depth $d$ of the slice or exit opening, is maintained at a value of less than 25. As in the previously described structure, it is desired that the stock pass through the headbox chamber under such conditions that the Reynolds number is in excess of 5,000.

The combination of features and operating procedures, as described, results in substantial improvement in the over-all operation of the headbox, and in addition, it results in a substantially improved sheet which can be manufactured at much higher speeds than have heretofore been obtainable.

Another headbox structure arranged for operation in accordance with certain of the principles of the invention is illustrated in Figure 14. In this apparatus, similar to the previously described structures, the walls of the headbox are defined by suitable structural members, and the headbox is operative to discharge a stream of stock onto a forming wire 335 which is trained about a breast roll 337. A source of stock, which may constitute a mixing trough connected to receive the discharge from a series of Bird screens is illustrated at 339. The trough 339, which has a width substantially equal to its depth, discharges into the first section 341 of the headbox, and this section of the headbox is so constructed that it constitutes a second and somewhat deeper trough having a transverse width which is substantially equal to or which diverges to a width which is substantially equal to the width of the machine.

The headbox is provided with a plurality of spaced flow control baffles 343, 345, 347, and 349, or partitions, which extend completely across the headbox so as to divide the interior of the headbox into a plurality of sections. The first of these baffles, the baffle 343, defines the downstream wall of the initial section 341 of the headbox, and this baffle is adjustably supported, in order that it may be moved upwardly and downwardly to provide an elongated opening 351 of adjustable height through which the stock flows from the first section 341 into the second section 353 of the headbox.

In order to effect accurate control of the position of the baffle 343 and thereby the dimensions of the opening 351, the mechanism includes a number of spaced-apart, internally threaded gear units 355, each of which is adapted to engage a threaded rod 357 attached to the baffle 343. The gear units 355 are arranged to be operated in unison by a series of worm gears 359 mounted on a single shaft 361 which extends transversely across the machine.

The shaft 361 may be power-driven or may be operated by a hand wheel, such as is illustrated at 363, and the entire adjusting mechanism is supported upon a suitable beam structure 365 which extends across the two sides of the headbox. The intermediate baffles 345, 347, and 349 are fixed in position and serve to define an undulating flow path through the headbox.

The final section 367 of the headbox is pressurized, and the walls of this section are defined by the side walls 369 of the headbox, the baffle 349, the elevated bottom section 371 of the headbox, the downstream wall 373 of the headbox, and a cover section 375 which extends between the side walls, as shown in the drawing. The cover section 375 is provided with one or more access openings as indicated at 376. The pressurized section 367 of the headbox includes a pressure and level regulating mechanism embodying a diffusion-type air inlet mechanism 377 and a diffusion-type air outlet mechanism 379. The pressure and level regulating mechanism may be exactly similar to the structure shown in Figure 9, although it will be understood that other arrangements having equivalent operating characteristics can be used.

The illustrated headbox structure also includes an internal shower which may constitute a perforated pipe 381 mounted on suitable brackets 383 attached to the side walls 369 of the headbox and connected to a suitable source of shower fluid. To facilitate delivery of stock to the web-forming region on the wire 335, the bottom 371 of the pressurized section of the headbox is elevated relative to the upstream sections, and suitable pillars and frame structure, indicated at 385 and 387 are provided as a support means.

Stock is discharged from the pressurized section 367 of the headbox through a decreasing area flow passageway, 389, the upper surface of which is defined by a hinged slice plate 391, and the lower surface of which is defined by an apron plate 393, substantially as shown. To provide for adjustment of the opening at the discharge end of the passageway 389, the mechanism includes a plurality of spindle units 395 disposed at spaced intervals across the machine. Each of the spindle units is mounted on a shaft 397 and is connected to the slice plate by a tie-rod 399.

Stock is admitted to the pressurized section 367 of the headbox by way of a restricted opening 401, the top and bottom of which are defined by the lower edge of the baffle 349 and the adjacent surface of the elevated section 371 of the headbox bottom. Also, the apparatus includes a relatively small diameter distributor roll 403 positioned in front of the opening 401, as shown, in the path of stock flow therethrough.

The primary function of the distributor roll 403 is to act as a flow-evening means, and when used for that purpose, the dimensions of the regularly-spaced openings in the roll shell may be in accordance with usual distributor roll practice. The roll 403, may, however, be used as a mechanism for the production of fine-scale turbulence in the stream of stock which is delivered to the pressurized section of the headbox and when used for that purpose, the roll shell should be provided with a series of regularly-spaced, restricted dimension openings similar to the distributor rolls embodied in the previously described structures, i.e., the maximum width of the openings should be less than 1 inch and preferably about ½ inch.

In the manufacture of newsprint as speeds within the range of from 1250 to 1500 feet per minute from stock having a consistency of about .65 percent, satisfactory results were obtained by the use of a roll in the position of the roll 403 having a diameter of 14 inches, with regularly-spaced openings $9/16$ inch in diameter, with approximately 40 percent of the roll surface being open. This roll was operated under the above stated conditions at speeds within the range of from 10 to 25 r.p.m.

It will be understood that the utilization of a roll in this region which is capable of producing a condition of fine-scale turbulence within the stream of stock being delivered to the headbox constitutes an optional procedure in accordance with the invention. In other words, the most important advantages of the invention are obtained by the turbulence control which is effected in the final or delivery portion of the headbox structure, and control of the turbulence at the inflow side of the section wherein low-level operation is not maintained, while advantageous, is not essential to the invention.

During operation, the stock passes through the pressurized section 367 of the headbox as a low-level, rapidly flowing stream, i.e., at a velocity above about 60 feet per minute. As previously described, the level of the stock in this stream should not exceed 12 inches, and preferably is within the range of from 4 to 12 inches. The turbulence control mechanism used in this embodiment of the invention, similar to the previously described structures, constitutes one or more partially-submerged distributor rolls having small openings in the shells thereof and arranged in the path of flow of the low-level stream of stock.

If only one roll is used, it should be positioned adjacent the discharge side of the pressurized headbox section, as illustrated at 405. Additional rolls may be spaced at an intermediate position, as for example, as shown at 407. More specifically, the downstream roll 405 is desirably of such dimensions and is so positioned that the surface of the roll extends into close proximity with the adjacent vertical surface of the downstream wall 373 of the headbox along a line which is not substantially above or below the normal stock level within the headbox. If the downstream roll is being operated about one-half or a little more than one-half submerged, it will not be necessary to provide a supplementary baffle for preventing the creation of gross, secondary motion in the stream of stock which would be carried out of the headbox during operation of the machine, and the arrangement of Figure 14 is of this type.

If the downstream roll is being operated with a substantially higher level of stock, a baffle arrangement for blocking off the region in which gross, secondary motion might develop, as in the previously described embodiments, may be desirable. In any event, the downstream defining surface of the headbox chamber through which the low-level flowing stream is conducted must extend into close proximity to the perforated shell roll along a line which is at least approximately coincident with the stock level. The downstream roll 405, as in the previously described structures, is preferably rotated with its lower section moving in the same direction as that of the stock flow through the headbox chamber. The other rolls, when used, are generally rotated in the opposite direction.

The depth of the low-level flowing stream of stock passing through the headbox chamber should be correlated with reference to the vertical dimension of the stock discharge opening at the downstream end of the passageway to maintain a contraction ratio in the stream of stock being discharged to the web-forming region on the wire which is less than 25. Also, the downstream turbulence control roll should be located a sufficient distance from the stock discharge opening to assure diffusion of the jets which are created by the flow of stock through the openings in the roll shell. Normally, this means that the openings in the roll shell should be spaced a distance of at least 10 times the maximum width of the roll openings from the discharge opening. In certain instances, this may require lengthening or other modification of the slice plate.

Additionally, it is desirable that the lip of the slice plate be provided with adjustable means capable of defining a generally vertically-extending surface, similar to the surface 185 and the surface 285 in the previously described embodiments. Such a surface, as above described, interrupts the boundary layer in the flow through the stock discharge passageway and is of important assistance in assuring the delivery of the flowing stream of stock to the web-forming region without material change in the fine-scale turbulence conditions which have been created within the pressurized section of the headbox.

The structure of Figure 14 is exemplary of the embodiment of certain of the most important features of the invention into a standard headbox-type Fourdrinier machine with a minimum of alteration in the structure. In the particular apparatus illustrated, the only substantial changes that had to be made in the original structure were the pressurizing of the final section of the headbox, the installation of a level control mechanism and the installation of the small-opening distributor rolls, together with the drive means therefor. Changes such as this are fairly easy to make in the usual machine at relatively low cost, and while the changes do not make possible the attainment of all of the advantages of the invention, they do make possible the attainment of the most important of those advantages and the operation of the apparatus is correspondingly improved.

Specifically, the embodying of apparatus as described above into conventional headbox Fourdrinier machines will result not only in marked improvement in the quality of the paper produced, but that paper can be produced at much higher speeds than is practical with existing equipment. Also, it becomes possible to operate machines for a much longer period of time without shut-down.

In the foregoing, there have been disclosed certain operational principles of particular advantage in effecting improvement in the operation of standard headbox-type Fourdrinier papermaking machines, i.e., papermaking machines wherein the stream of stock from which the web is formed flows out of the headbox onto the upper surface of a moving Fourdrinier wire under such conditions that the web is formed on the wire at atmospheric pressure downstream of the headbox slice.

The most important of these principles is the concept that the flowing stream of stock delivered to the web-forming region on the wire should be caused to flow through at least that portion of the headbox immediately ahead of the stock discharge opening as a low-level stream within which there is created and maintained a dynamic condition of fine-scale turbulence, and the conducting of that stream of stock out of the headbox into the web-forming region under such conditions that the contraction ratio of the stream does not exceed a value of 25.

Other important principles of the invention include the discovery of the importance of eliminating surface disturbance of the low-level flowing stream of stock passing through the headbox, the prevention of the creation of gross, secondary motion in the stream of stock which might carry through beneath the slice into the web-forming region, the elimination and control of boundary layer conditions in the region where the flowing stream of stock is discharged onto the wire and the discovery that further improvement in the operation of apparatus in accordance with the invention can be accomplished by control of the turbulence conditions in the flowing stream of stock being delivered to the low-level section of the headbox.

Exemplary apparatus and mechanisms having particular advantages in effecting papermaking operation in accordance with these principles have also been disclosed. Of especial importance in this connection is the disclosure of turbulence generators such as perforated rolls and perforated plate mechanisms which utilize openings of a much smaller size than has heretofore been the practice, certain preferred methods of locating these turbulence generators within the apparatus, combinations of turbulence generator and baffle structures which are effective to attain the elimination of gross, secondary motion in the flowing stream of stock, and in general, the various new and novel structural features and arrangements described in the foregoing.

Various of the features of the invention believed to be new are expressly set forth in the appended claims.

We claim:

1. In papermaking apparatus, means defining the walls of a headbox having a ponding chamber which has spaced-apart stock inflow and stock outflow openings, stock supply means operable to deliver continuously a flowing stream of stock to the interior of said chamber via said stock inflow opening, an accelerating slice located at the outflow end of said ponding chamber, said slice and said wall-defining means having opposed cooperating surfaces which define a contracting area stock discharge passageway through which stock is accelerated and conducted out of said ponding chamber, said slice including means defining a generally vertical surface having a dimension within the range of from ½ to 1½ inches which is positioned to act upon the upper boundary layer of the stream being discharged from the headbox at the discharge end of said passageway.

2. In papermaking apparatus, means defining the walls of a headbox having a ponding chamber which has spaced-apart stock inflow and stock outflow openings, stock supply means operable to deliver continuously a flowing stream of stock to the interior of said chamber via said stock inflow opening, an accelerating slice located at the outflow end of said ponding chamber, said slice and said wall-defining means having opposed cooperating surfaces which define a contracting area stock discharge passageway through which stock is accelerated and conducted out of said ponding chamber, turbulence generating means located within said ponding chamber adjacent the entrance to said stock discharge passageway, and said slice including means defining a generally vertical surface having a dimension within the range of from ½ to 1½ inches which is positioned to act upon the upper boundary layer of the stream being discharged from the headbox at the discharge end of said passageway.

3. In papermaking apparatus, means defining the walls of a headbox having a ponding chamber which has spaced-apart stock inflow and stock outflow openings, stock supply means operable to deliver continuously a flowing stream of stock to the interior of said chamber via said stock inflow opening, an accelerating slice located at the outflow end of said ponding chamber, said slice and said wall-defining means having opposed cooperating surfaces which define a contracting area stock discharge passageway through which stock is accelerated and conducted out of said ponding chamber, a hollow, perforated rotatable roll located within said ponding chamber adjacent the entrance to said stock discharge passageway, and said slice including means defining a generally vertical surface having a dimension within the range of from ½ to 1½ inches which is positioned to act upon the upper boundary layer of the stream being discharged from the headbox at the discharge end of said passageway.

4. In papermaking apparatus, means defining the walls of a headbox having a ponding chamber which has spaced-apart stock inflow and stock outflow openings, stock supply means operable to deliver continuously a flowing stream of stock to the interior of said chamber via said stock inflow opening, an accelerating slice located at the outflow end of said ponding chamber, said slice and said wall-defining means having opposed cooperating surfaces which define a contracting area stock discharge passageway through which stock is accelerated and conducted out of said ponding chamber, and turbulence generating means having openings located adjacent the entrance to said stock discharge passageway, the individual openings in said turbulence generating means having a maximum dimension no greater than about one-half inch, and said slice including means defining a generally vertical surface having a dimension within the range of from ½ to 1½ inches which is positioned to act upon the upper boundary layer of the stream being discharged from the headbox at the discharge end of said passageway.

5. In papermaking apparatus of the class described, a stock supply conduit, means for delivering a flowing stream of stock to said conduit, means defining the walls of a ponding chamber having stock inflow and stock outflow openings provided therein, a flow spreading conduit connecting the outflow end of the stock supply conduit and the inflow opening into said ponding chamber, a perforated wall means located in the stock supply conduit adjacent the inflow end of said flow spreading conduit operable to even the flowing stream of stock passing through said supply conduit and to create within said flowing stream of stock a condition of fine scale turbulence, an adjustable throttling slice located at the inflow end of said ponding chamber, said throttling slice and said wall defining means having opposed cooperating surfaces which provide an expanding area cross-sectional passageway for maintaining said fine scale turbulence within the stream of stock entering the ponding chamber, said throttling slice defining one of the sides of said inflow opening to said ponding chamber, and a second adjustable slice located at the outflow end of said ponding chamber, said second slice and said wall defining means having opposed cooperating surfaces which define a contracting area stock discharge passageway for maintaining said condition of fine scale turbulence in the stream of stock being delivered from said ponding chamber.

6. In papermaking apparatus of the class described, a stock supply means including a stock supply conduit, means defining the walls of a ponding chamber having stock inflow and stock outflow openings, a flow spreading conduit connecting the outflow end of said stock supply conduit to the inflow opening in said ponding chamber, stock control and deaerating means located in said stock supply conduit adjacent the inflow end of said flow spreading conduit, said stock control and deaerating means comprising a section of said conduit of enlarged, cross-sectional area, which is of such form and is so positioned that an air space exists above the stream of stock flowing through said section, and pump means for maintaining reduced pressure in said air space, flow-evening means comprising a perforated wall member located in said stock supply conduit upstream of, and adjacent to, said stock control and deaerating means, a first throttling slice located at the inflow side of said ponding chamber, said slice defining one of the sides of the stock inflow opening into said ponding chamber, a second throttling slice located at the outflow side of said ponding chamber and defining one of the sides of said outflow opening.

7. In a headbox structure, means defining the walls of a ponding chamber which is open at the inflow and outflow ends thereof, adjustable means cooperating with said wall-defining means to close the outflow end of said ponding chamber except for a stock outflow opening, and an adjustable throttling slice which cooperates with said wall-defining means to close the other end of said ponding chamber except for a stock inflow opening of adjustable cross-sectional area, said throttling slice and said wall-defining means having opposed, cooperating surfaces which define a generally wedge-shaped inflow passageway leading from said stock inflow opening into said ponding chamber and increasing in cross-sectional area in the downstream direction, said throttling slice being movable relative to said wall-defining means to vary the cross-sectional area of said stock inflow passageway without material change in the shape and hydraulic characteristics of that passageway, and the divergence angle encompassed by the opposed cooperating surfaces which define the stock inflow passageway being within the range of from about 3 to 15° for a distance along the path of flow immediately following the inflow opening which is equal to at least five times the depth of the inflow opening.

8. In papermaking apparatus of the class described, means defining the walls of a headbox which includes a ponding chamber and which is provided with stock inflow and stock outflow openings, stock supply means which is operable to deliver a flowing stream of stock to said inflow opening, a throttling slice at said inflow opening, which slice is so positioned and of such dimensions that there is produced a condition of fine-grain turbulence in the flowing stream of stock passing into said headbox, means defining the walls of a generally wedge-shaped flow passageway which connects said stock inflow opening with the ponding chamber within said headbox, said passageway being of increasing cross-sectional area in the downstream direction, the maximum divergence angle encompassed between the walls which define said passageway being within the range of from about 3 to 15° for a distance along the path of flow immediately following the inflow opening which is equal to at least five times the depth of the inflow opening, and a second slice located at the outflow side of said ponding chamber, which is operable to vary the dimensions of said outflow opening.

9. In papermaking apparatus of the class described, means defining the walls of a headbox which includes a ponding chamber and a distributor roll located within said ponding chamber, said headbox being totally enclosed except for spaced-apart stock inflow and stock outflow openings, a stock supply means operable to deliver continuously a flowing stream of stock to said stock inflow opening, throttling means including a throttling slice, located at said inflow opening, said means being so positioned and of such dimensions that there is produced a condition of fine-grain turbulence in the flowing stream of stock passing into said headbox, means defining the walls of a diverging, generally wedge-shaped flow passageway which connects said stock inflow opening with the ponding chamber within said headbox, said passageway being of increasing cross-sectional area in the downstream direction and having such outline and length that the fine-grain turbulence created in said stream is maintained during the passage of said stream into said headbox and said stream is conducted into said ponding chamber without the formation of large scale eddies or boiling, and means including a source of pressure air for maintaining the level of stock within said ponding chamber at a predetermined depth within said ponding chamber whereby said distributor roll is maintained only partially submerged, the means defining said diverging flow passageway including flat-surfaced plate members and wherein the maximum divergence angle encompassed between said plate members is within the range of from about 3 to 15° for a distance along the path of flow immediately following the inflow opening which is equal to at least five times the depth of the inflow opening.

10. In papermaking apparatus of the class described, stock supply means including a stock supply conduit, means defining the walls of a ponding chamber, a flow spreading conduit connecting the outflow end of said stock supply conduit with the inflow side of said ponding chamber, a slice located at the inflow side of said ponding chamber in position to define a surface of an elongated, relatively shallow stock inflow passageway through which stock flows into said ponding chamber, support means for said slice which is operable to move said slice as a unit and thereby to vary the depth of said stock inflow passageway, means defining a stock outflow opening at the outflow side of said ponding chamber, and means including a flexible member, which extends transversely of said stock inflow passageway and which defines one of the transverse outlining surfaces of that passageway, and means for producing localized distortion of said surface defining member, for effecting controlled, transversely localized variation in the depth of said stock inflow passageway.

11. Apparatus as defined in claim 10, wherein the said means for effecting controlled, transversely localized variation in the depth of said stock inflow passageway constitutes a flexible, diaphragm-like surface defining member, a backing support for said flexible member, and a plurality of separate, spaced-apart means for producing transversely localized distortion of said backing support.

12. In papermaking apparatus of the class described, means defining the side walls, one end wall and the bottom of a headbox, means supported on said end wall and defining with that wall the two sides and one face of a laterally diverging, vertically-extending, flow spreading conduit leading to the inflow side of said headbox, a throttling slice structure located at the inflow side of said headbox, said slice structure including a box-like, vertically extending slice body, and means supporting said slice body within said headbox for movement into and out of engagement with said means which defines the sides of said flow spreading conduit, one of the surfaces of said slice body constituting the other defining surface of said flow spreading conduit when said slice body is in engagement with the said means defining the sides of that conduit.

13. In the operation of a headbox type papermaking machine wherein a flowing stream of stock is continuously admitted to the headbox and discharged therefrom onto the upper surface of a moving Fourdrinier wire, the improvement which consists of discharging liquid having a temperature and pH similar to that of the stock within said headbox into the upper portion of said headbox above the level of said stock for preventing any accumulation of fiber within the headbox without causing channelling of the liquid within the stock and/or imperfect mixing of the liquid with the stock.

14. In the operation of an enclosed pressurized headbox type papermaking machine wherein a flowing stream of stock is continuously admitted to the headbox and discharged therefrom to the upper surface of a moving Fourdrinier wire, the improvement which consists in controlling the air pressure within the headbox to maintain the depth of the stock within the headbox at a low level, creating a condition of fine scale turbulence within the flowing stream of stock passing through the headbox and discharging liquid having a temperature and pH similar to that of the stock within said headbox into the upper portion of said headbox above the level of said stock for preventing any accumulation of fiber within the headbox without causing channelling of the liquid within the stock and/or imperfect mixing of the liquid with the stock.

15. The method of operating a standard-type Fourdrinier papermaking machine wherein the stock is delivered from an enclosed, pressurized headbox to the upper surface of a moving Fourdrinier wire as a shallow stream of wire width, under controlled conditions of turbulence, comprising the steps of maintaining the pressure within the headbox at such value that the stock within the headbox is held to a depth of less than 12 inches, creating a condition of fine-scale turbulence within the flowing stream of stock passing through the headbox and delivering the stock to the forming region on the wire under such conditions that the contraction ratio in the stream of stock during delivery, i.e., the ratio of the average depth of stock in the headbox divided by the average depth of the stream of stock discharged onto the wire, does not exceed 25.

16. The method of operating a standard-type Fourdrinier papermaking machine, wherein the stock is delivered from an enclosed, pressurized headbox to the upper surface of a moving Fourdrinier wire as a shallow stream of wire width, which is at approximately wire velocity and under controlled conditions of turbulence, comprising the steps of delivering the stock to the headbox, adjusting the pressure within the headbox to maintain the depth of the stock therewithin at a predetermined value, creating a condition of fine-scale turbulence within the flowing stream of stock passing through the headbox by the use of at least one turbulence control member located within the headbox, and delivering the stock to the forming region on the wire under such conditions that the contraction ratio in the stream of stock during delivery, i.e., the ratio of the average depth of stock in the headbox divided by the average depth of the stream of stock discharged onto the wire, does not exceed 25.

17. The method of operating a standard-type Fourdrinier papermaking machine, wherein the stock is delivered from an enclosed, pressurized headbox to the surface of a moving, Fourdrinier wire as a shallow stream of wire width, which is at atmospheric pressure and at approximately wire velocity, and which is under controlled conditions of turbulence, comprising the steps of delivering the stock to the interior of the headbox as a high-energy flowing stream, maintaining the stock within the headbox at above-atmospheric pressure, whereby the depth of the stock within the headbox is maintained at a predetermined value, producing a condition of fine-scale turbulence in the stream of stock which is contained within and is passing through said headbox, delivering the stock from the headbox to the web-forming region on the wire through a contracting area stock discharge passageway through which the stock is accelerated and under such conditions that the contraction ratio in the stream of stock during delivery, i.e., the ratio of the average depth of stock in the headbox divided by the average depth of the stream of stock discharged onto the wire, does not exceed 25.

18. In the operation of a headbox type paper-making machine, wherein a flowing stream of stock is continuously admitted to, and discharged from, the headbox chamber, the improvement which consists in controlling and accelerating the flowing stream of stock which is being admitted to the headbox chamber to create therein a condition of fine-grain turbulence, immediately thereafter conducting the flowing stream of stock so controlled into the interior of the headbox, maintaining the depth of the flowing stream of stock passing through the headbox chamber at not more than 12 inches to aid in maintaining said condition of fine-grain turbulence in the flowing stream of stock passing through said headbox, and finally continuously delivering said flowing stream of stock from said headbox into the web-forming region of the machine, while subjecting the stock so discharged to a throttling and accelerating action which maintains said controlled condition of fine-scale turbulence.

19. The method of delivering a flowing stream of stock to the web-forming region of a headbox-type papermaking machine, which comprises throttling and accelerating a narrow and relatively deep flowing stream of stock to an extent sufficient to produce therein a region of fine-grain turbulence, conducting the flowing stream of stock so throttled and accelerated through a laterally-diverging flow spreading means in order to decrease the depth of the flowing stream of stock and to increase the width of the stream to a width substantially equal to the width of the web-forming region, throttling and accelerating the flowing stream of stock discharged from the flow spreading means to an extent sufficient to produce a second region of fine-grain turbulence, conducting the flowing stream of stock so throttled and accelerated into the headbox ponding chamber as a wedge-shaped stream of full machine width and of increasing cross-sectional area in the direction of flow, whereby the fine-grain turbulence existing therein is maintained within said stream as it flows into the headbox ponding chamber, maintaining the stream of stock flowing into and through the headbox ponding chamber at a depth which is not materially greater than the depth of the stream being admitted to the headbox ponding chamber and not more than 12 inches, and finally throttling and accelerating the stream of stock flowing through said ponding chamber in the region where it is discharged to the web-forming region of the papermaking machine.

20. In papermaking apparatus of the class described, a stock supply conduit, means for delivering a flowing stream of stock to said conduit, means defining the walls of a ponding chamber having stock inflow and stock outflow openings provided therein, a flow spreading conduit connecting the outflow end of the stock supply conduit and the inflow opening of said ponding chamber, a perforated wall means located in the stock supply conduit adjacent the inflow end of said flow spreading conduit operable to even the flowing stream of stock passing through said supply conduit and to create within said flowing stream of stock a condition of fine scale turbulence, a throttling slice adjacent the inflow end of said ponding chamber, said throttling slice and said wall defining means having opposed cooperating surfaces which provide an expanding area cross-sectional passageway for maintaining said fine scale turbulence within the flowing stream of stock, and a second slice located at the outflow end of said ponding chamber, said second slice and said wall defining means having opposed cooperating surfaces which define a contracting area stock discharge passageway for maintaining said condition of fine scale turbulence in the stream of stock being delivered to the web-forming region.

References Cited in the file of this patent

UNITED STATES PATENTS

| | | |
|---|---|---|
| 2,186,761 | Malkin | Jan. 9, 1940 |
| 2,347,130 | Seaborne | Apr. 18, 1944 |
| 2,381,286 | Hornbostel et al. | Aug. 7, 1945 |
| 2,509,822 | Hornbostel | May 30, 1950 |
| 2,550,552 | Goodwillie | Apr. 24, 1951 |
| 2,563,790 | Lowe | Aug. 7, 1951 |
| 2,589,639 | Staege | Mar. 18, 1952 |
| 2,615,374 | Malkin | Oct. 28, 1952 |
| 2,619,011 | Staege | Nov. 25, 1952 |
| 2,677,991 | Goumeniouk | May 11, 1954 |
| 2,736,247 | Hornbostel | Feb. 28, 1956 |

OTHER REFERENCES

Bratton et al.: "The Flowspreader," page 114, Paper Trade Journal, Oct. 1, 1942.